United States Patent [19]

Mitsui et al.

[11] Patent Number: 5,408,345

[45] Date of Patent: Apr. 18, 1995

[54] REFLECTION TYPE LIQUID CRYSTAL DISPLAY DEVICE WHEREIN THE REFLECTOR HAS BUMPS

[75] Inventors: Seiichi Mitsui; Naofumi Kimura; Yasunori Shimada, all of Nara; Hisakawa Nakamura; Makoto Kanbe, both of Tenri, all of Japan

[73] Assignee: Sharp Kabushiki Kaisha, Osaka, Japan

[21] Appl. No.: 265,511

[22] Filed: Jun. 24, 1994

Related U.S. Application Data

[63] Continuation of Ser. No. 942,284, Sep. 9, 1992, abandoned.

[30] Foreign Application Priority Data

| Sep. 10, 1991 | [JP] | Japan | 3-230608 |
| Nov. 29, 1991 | [JP] | Japan | 3-316667 |
| Jul. 3, 1992 | [JP] | Japan | 4-177096 |

[51] Int. Cl.$^6$ .................. G02F 1/1343; G02F 1/1335; G02F 1/1333
[52] U.S. Cl. ........................ 359/59; 359/70; 359/79; 359/87
[58] Field of Search .................. 359/59, 70, 87, 79

[56] References Cited

U.S. PATENT DOCUMENTS

| 4,431,272 | 2/1984 | Yazawa et al. | 359/70 |
| 4,519,678 | 5/1985 | Komatsubara et al. | 359/70 |
| 5,204,765 | 4/1993 | Mitsui et al. | 359/70 |
| 5,210,628 | 5/1993 | Shields et al. | 359/79 |

FOREIGN PATENT DOCUMENTS

| 0112417 | 7/1984 | European Pat. Off. . | |
| 0234429 | 2/1987 | European Pat. Off. . | |
| 0317910 | 5/1989 | European Pat. Off. . | |
| 54-37697 | 3/1979 | Japan | 359/59 |
| 59-19339 | 5/1984 | Japan . | |
| 63-127227 | 5/1988 | Japan | 359/79 |

OTHER PUBLICATIONS

White et al. "New absorptive mode reflective liquid crystal display device", J. Appl. Phys. 45 (Nov. 1974), pp. 4718–4723.

Koizumi et al. "Reflective Multicolor Lcd(II): Improvement in the Brightness" Proceedings of the SID, vol. 29/2, (1988), pp. 157–160.

Primary Examiner—Anita Pellman Gross
Assistant Examiner—Ron Trice
Attorney, Agent, or Firm—David G. Conlin; Geroge W. Neuner

[57] ABSTRACT

The object of this invention is to enhance the display quality of reflection type liquid crystal display device having the constitutions of an organic insulating film is formed on a thin film transistor formed on a substrate, and contact holes and bumps are formed at the positions for forming reflection electrodes on the organic insulating film. The reflection electrodes are formed thereon, and drain electrodes and reflection electrodes 38 are connected through the contact holes. The effect of this invention is since the bumps are formed only in the portions of the reflection electrodes, patterning of the reflection electrodes is easy, and insulation failure between source bus wirings and reflection electrodes does not occur, and the display quality is enhanced.

18 Claims, 27 Drawing Sheets

REFLECTION TYPE LIQUID CRYSTAL DISPLAY DEVICE WHEREIN THE REFLECTOR HAS BUMPS

This is a continuation of application Ser. No. 07/942,284, filed on Sep. 9, 1992, now abandoned.

BACKGROUND OF THE INVENTION

1. Field of the Invention

The present invention relates to a reflection type liquid crystal display device and a method of manufacturing the device for displaying by reflecting the incident light.

2. Description of the Related Art

Recently applications of liquid crystal display devices in word processor, laptop personal computer, pocket television and others are rapidly advancing. In particular, among the liquid crystal display devices, the reflection type liquid crystal display device for displaying by reflecting the entering light is highly noticed because the power consumption is low since the backlight is not needed, and the design is thin and can be reduced in weight.

Hitherto, for the reflection type liquid crystal display device, the TN (twisted nematic) method and STN (super-twisted nematic) method have been employed, but in these methods, ½ of the luminous intensity of natural light is not utilized in display because of the use of the polarizer, and the display is dark.

To solve this problem, display modes for effectively utilizing all of rays of natural light without using polarizer have been proposed. An example of such modes is a phase transition type guest-host method (D. L. White and G. N. Taylor: J. Appl. Phys. 45 4718, 1974). In this mode, the cholesteric-nematic phase transition phenomenon due to electric field is utilized. By combining this method with micro color filter, a reflection type multicolor display is also proposed (Tohru Koizumi and Tatsuo Uchida, Proceedings of the SID, Vol. 29/2, 157, 1988).

To obtain a brighter display in the mode not requiring polarizer, it is necessary to increase the intensity of light scattering in a direction vertical to the display screen, for the incident light from all angles. For this purpose it is needed to make a reflector having an optimum reflective characteristic. The above publication discloses a reflector manufactured by roughening the surface of substrate such as glass with abrasive, controlling the surface asperities by varying the time of etching with hydrofluoric acid, and forming a silver foil on the asperities.

In this disclosed reflector, since asperities are formed by injuring the glass substrate with abrasive, asperities of uniform shape are not formed. Another problem is the poor reproducibility of the shape of the asperities, and it is impossible to present a reflection type liquid crystal display device possessing excellent reflective characteristics at high reproducibility by using glass substrate.

FIG. 1 is a plan view of a substrate 2 possessing a thin film transistor (TFT) which is a switching element used in active matrix method, and FIG. 2 is a sectional view of XI—XI in FIG. 1. On an insulating substrate 2 of glass or the like, plural gate bus wirings 3 made of chromium, tantalum or the like are disposed parallel mutually, and gate electrodes 4 are branched off from the gate bus wirings 3. The gate bus wirings 3 function as scanning lines.

Covering the gate electrodes 4, a gate insulating film 5 made of silicon nitride (SiNx), silicon oxide (SiOx) or the like is formed on the entire surface of the substrate 2. On the gate insulating film 5 above the gate electrode 4, a semiconductor layer 6 composed of amorphous silicon (a-Si), polycrystalline silicon, CdSe or the like is formed. At one end of the semiconductor layer 6, a source electrode 7 made of titanium, molybdenum, aluminum or the like is superposed. At the other end of the semiconductor layer 6, same as the source electrode 7, a drain electrode 8 made of titanium, molybdenum, aluminum or the like is superposed. At the opposite end of the drain electrode 8 against the semiconductor layer 6, a picture element electrode 9 made of ITO (indium tin oxide) is superposed.

As shown in FIG. 1, a source bus wirings 10 crossing the gate bus wirings 3 across the gate insulating film 5 is connected to the source electrode 7. The source bus wirings 10 function as signal lines. The source bus wirings 10 are also made of the same metal as the source electrode 7. The gate electrode 4, gate insulating film 5, semiconductor layer 6, source electrode 7, and drain electrode 8 composed a TFT 1, and this TFT 1 possesses the function of switching element.

To apply the substrate 2 possessing the TFT 1 shown in FIG. 1 and FIG. 2 in a reflection type liquid crystal display device, it is necessary to form the picture element electrode 9 by using a metal possessing light reflectivity such as aluminum and silver, and form the gate insulating film 5 or asperities thereon. Generally, it is difficult to form tapered asperities uniformly on an insulating film made of inorganic matter.

FIG. 3 is a plan view of a substrate 12 possessing a TFT 11 used in active matrix method, and FIG. 4 is a sectional view of XII—XII in FIG. 2. On an insulating substrate 12 made of glass or the like, plural gate bus wirings 13 made of chromium, tantalum or the like are disposed parallel mutually, and gate electrodes 14 are branched off from the gate bus wirings 13. The gate bus wirings 13 function as scanning lines.

Covering the gate electrodes 14, a gate insulating film 15 made of silicon nitride, silicon oxide or the like is formed on the entire surface of the substrate 12. On the gate insulating film 15 above the gate electrode 14, a semiconductor layer 16 made of a-Si or the like is formed. At both ends of the semiconductor layer 16, contact layers 17 made of a-Si or the like are formed. On one contact layer 17, a source electrode 18 is superposed, and on the other contact layer 17, a drain electrode 19 is superposed. Source bus wirings 23 functioning as signal lines crossing the gate bus wirings 13 across the gate insulating film 15 are connected to the source electrode 18. The gate electrode 14, gate insulating film 15, semiconductor layer 16, contact layer 17, source electrode 18, and drain electrode 19 compose a TFT 11.

Further, an organic insulating film 20 possessing plural bumps 20a and having a contact hole 21 on the drain electrode 19 is formed. On the organic insulating film 20, a reflection electrode 22 is formed, and the reflection electrode 22 is connected to the drain electrode 19 through the contact hole 21.

When the organic insulating film 20 is formed on the substrate 12 having such TFT 11 formed thereon, the bumps 20a may be easily formed on the surface of the organic insulating film 20 by employing the etching method, and by forming the reflection electrode 22 on the organic insulating film 20 having the bumps 20a, the reflection electrode 22 having asperities may be easily formed.

As shown in FIG. 1 and FIG. 2, when forming the reflection electrode 9 and source bus wirings 10 on the gate insulating layer 5, a gap 9a is formed so as to prevent conduction between the reflection electrode 9 and source bus wirings 10. However, as shown in FIG. 3 and FIG. 4, such gap 9a is not needed when the source bus wirings 23 are formed on the gate insulating film 15, and the reflection electrode 22 on the organic insulating film 20.

To enhance the luminance of display, it is desired that the reflection electrode 22 be as large as possible. In FIG. 3 and FIG. 4, therefore, the end portion of the reflection electrode 22 is formed on the source bus wirings 23 through the organic insulating film 20.

Since the organic insulating film 20 possesses the bumps 20a, if etching failure of contact of the bottom portion 20b of the adjacent bumps 20a on the source bus wiring 23 occurs, insulation by the organic insulating film 20 is not achieved, and insulation failure may occur between the source bus wirings 23 and the reflection electrode 22 formed on the organic insulating film 20.

When patterning, meanwhile, the reflection electrode 22 in order to form the organic insulating film 20 possessing bumps 20a on the entire surface of the substrate, asperities may be formed in the end portion of the reflection electrode 22 due to bumps 20a, which may result in defective patterning of the reflection electrode 22.

Furthermore, when the reflection electrode 22 is formed through the organic insulating film 20 on the semiconductor layer 16 of the connecting part on the gate electrode 14 which is a distribution electrode formed on the substrate, the signal to be applied to the reflection electrode 22 is applied to the semiconductor layer 16, and the reflection electrode 22 spuriously acts like the gate electrode 14, and a channel is formed in the interface between the reflection electrode 22 and semiconductor layer 16, thereby lowering the characteristic of the TFT 11. Besides, a large parasitic capacity is generated between the gate electrode 14 and reflection electrode 22. These phenomena cause to lower the display grade.

SUMMARY OF THE INVENTION

It is hence a primary object of the invention to present a reflection type liquid crystal display device enhanced in display quality and its manufacturing method, capable of solving the above problems and forming the reflector possessing excellent reflective characteristics easily and at high reproducibility.

To achieve the above object, the invention presents a reflection type liquid crystal display device composed by forming, on the liquid crystal layer side surface on one of the substrates of a pair of transparent substrates disposed oppositely across a liquid crystal layer, plural reflection electrodes as display picture elements for reflecting the incident light from the other substrate side, and distribution electrodes for applying voltage for display to the reflection electrodes, and forming common electrodes possessing light transmissivity nearly over the entire surface on the liquid crystal layer side surface on the other substrate, wherein the reflection electrodes are formed on an electric insulating film covering the entire surface of the substrate except for the connection parts with the reflection electrodes on the distribution electrodes formed on one substrate and possessing plural bumps only in the reflection electrode forming regions not overlapping with the distribution electrodes.

In the invention, the bumps are arranged irregularly.

In the invention, the bumps are formed in a taper having a spherical end portion.

In the invention, the bumps are formed in one or two or more different types differing in size.

In the invention, the height of the bumps is not more than 10 μm.

In the invention, the arrangement pattern of bumps is identical in each reflection electrode.

It is another feature of the invention to form a light shielding film possessing an electric insulating property in the region of connecting part with the reflection electrode on the distribution electrode formed on one substrate and in the region not overlapping with the reflection electrode on the distribution electrode.

The invention also presents a reflection type liquid crystal display device possessing a reflector for reflecting the incident light from the other substrate side, on one of the substrates of a pair of substrates disposed oppositely across a liquid crystal layer, wherein the reflector is formed on an electric insulating film formed on plural bumps arranged irregularly at the liquid crystal layer side on one substrate.

In the invention, the plural bumps irregularly arranged at the liquid crystal layer side on one substrate are formed in one or two or more different types differing in size.

In the invention, the plural bumps irregularly arranged at the liquid crystal layer side on one substrate are formed in a traper having a spherical end portion.

In the invention, the height of the bumps of the electric insulating film formed on the plural bumps is not more than 10 μm.

In the invention, the plural bumps of the reflector arranged irregularly at the liquid crystal layer side on one substrate are 20 μm or less in diameter, and occupy 40% or more of the total area of the reflector.

In the invention, the reflector is an electrode to be used as a display picture element.

The invention moreover presents a manufacturing method of reflection type liquid crystal display device possessing a reflector for reflecting the incident light from the other substrate side, on one substrate of a pair of substrates disposed oppositely across a liquid crystal layer, the method comprising applying a photosensitive resin to the liquid crystal layer side surface of one substrate, exposing the photosensitive resin through light shielding means having circular light shielding regions arranged irregularly, developing the photosensitive resin, forming plural bumps by heating the photosensitive resin, forming an insulating film covering the plural bumps on the obtained plural bumps, and forming the reflector made of thin metal film on the insulating film.

In the invention, the total area of the circular light shielding regions of the light shielding means occupy 40% or more of the total area of the light shielding means, and the diameter of the circles arranged irregularly is 20 μm or less.

According to the invention, in the reflection type liquid crystal display device, a liquid crystal layer is interposing between a pair of opposing transparent substrates. At this time, plural reflection electrodes and distribution electrodes are formed on the liquid crystal layer side surface on one substrate, and common electrodes are formed on the liquid crystal layer side surface on the other substrate. The reflection electrodes are display picture elements, and the display is presented by reflecting the incident light entering through the other substrate and common electrodes. The distribution electrodes realized by gate bus wiring, source bus wiring and thin film transistor apply the voltage for display to the reflection electrodes. The common electrodes formed on the other substrate are formed nearly on the entire surface of the other substrate.

In the reflection type liquid crystal display device of the invention, the reflection electrodes are formed on the insulating film composed of high molecular resin, the insulating film covers the entire surface of one substrate, except for the connection parts with reflection electrodes, such as the gate bus wiring, source bus wiring and thin film transistor formed on one substrate, and drain electrodes of thin film transistor on the distribution electrodes, and the insulating film has bumps forming only in the reflection electrode forming regions not overlapping with the distribution electrodes. Thus, since the reflection electrodes are formed on the bumps, bumps corresponding to these bumps are also formed on the reflection electrode surface. When asperities are formed on the light reflection plane, the intensity of light scattering in the direction vertical to the display screen is increased, for the incident light from all angles, so that the display luminance is enhanced, thereby improving the display contrast, which is well known. The bumps formed on the insulating film are formed only in the regions of forming only the reflection electrodes, and not formed on the distribution electrodes, and therefore if the recesses among the bumps are formed deeply, insulation failure due to contact of reflection electrodes and distribution electrodes does not occur. Besides, since bumps are not formed on the distribution electrodes, there are no asperities at the end position of the reflection electrodes, so that the reflection electrodes may be patterned favorably.

In the invention, the bumps are arranged irregularly, and the shape of the bumps are tapered and the front end portion is formed in a spherical shape, and moreover the bumps are formed in one or two or more different types differing in size. All these means are effective, same as mentioned above, to increase the intensity of light scattering in the direction vertical to the display screen, for the incident light from all angles.

The height of the bumps of the invention is not more than 10 μm. Usually, the thickness of the cell of the reflection type liquid crystal display device is 10 μm or less, and by defining the height of the bumps less than the cell thickness, cells may be formed uniformly, and it has the same effect as mentioned above to increase the intensity of light scattering in the direction vertical to the display screen, for the incident light from all angles.

The arrangement pattern of bumps of the invention is identical in each reflection electrode, and it is not necessary to form arrangement patterns on every reflection electrode, and when one arrangement pattern is formed, the bumps may be formed in all regions forming only the reflection electrodes.

Moreover in the invention, a light shielding film possessing an electric insulating property is formed in the region of connecting part with the reflection electrode on the distribution electrode formed on one substrate and in the region not overlapping with the reflection electrode on the distribution electrode. As a result, the reflected light in other portions than the reflection electrode is shielded.

According to the invention, in the reflection type liquid crystal display device possessing a reflector for reflecting the incident light from the other substrate on one substrate of a pair of substrates disposed oppositely across a liquid crystal layer, the reflector is formed on an insulating film formed on the bumps arranged irregularly at the liquid crystal layer side of one substrate. Hence the reflector has irregular bumps corresponding to the bumps of the insulating film. The shape of the insulating film may be controlled easily, uniformly and at high reproducibility. Since the bumps of the reflector are formed corresponding to the irregular bumps on the insulating film formed easily, the reflector of excellent reflective characteristics may be formed.

In the invention, the bumps are arranged irregularly, and the shape of the bumps are tapered and the front end portion is formed in a spherical shape, and moreover the bumps are formed in one or two or more different types differing in size. All these means are effective, same as mentioned above, to increase the intensity of light scattering in the direction vertical to the display screen, for the incident light from all angles.

In the invention, the plural bumps arranged irregularly at the liquid crystal side of one substrate are formed the front end portion in a spherical shape, which is effective, same as mentioned above, for increasing the intensity of the light scattered in the direction vertical to the display screen, for the incident light from all angles.

The height of the bumps of the invention is not more than 10 μm. Usually, the thickness of the cell of the reflection type liquid crystal display device is 10 μm or less, and by defining the height of the bumps less than the cell thickness, cells may be formed uniformly, and it has the same effect as mentioned above to increase the intensity of the light scattering in the direction vertical to the display screen, for the incident light from all angles.

In the invention, the plural bumps arranged at the liquid crystal side surface of one substrate are 20 μm or less in diameter, and occupy 40% or more of the total area of the reflector, and the reflector is formed on the bumps through an electric insulating film, so that a high reflectivity may be obtained.

The reflector may be also used as an electrode which is a display picture element. In this case, without any parallax, a favorable display is realized.

According to the invention, in the reflection type liquid crystal display device possessing a reflector for reflecting the incident light from the other substrate, on one substrate of a pair of substrates disposed oppositely across a liquid crystal layer, a photosensitive resin is applied at the liquid crystal layer side on one substrate. The photosensitive resin is heated after being exposed through light shielding means forming light shielding regions arranged irregularly and developed, and irregular bumps made of photosensitive resin are formed on one substrate. On the bumps, an insulating film is formed so as to cover one substrate, and the insulating film is shaped corresponding to the bumps. Further thereon, the reflector made of metal thin film is formed along the bumps of the insulating film surface.

The bumps on the reflector surface correspond to the bumps formed by the photosensitive resin. The shape of the photosensitive resin may be controlled easily, uniformly and at high reproducibility. Thus, since the bumps of the reflector are formed corresponding to the irregular bumps of the easily formed insulating film, the reflector of excellent reflective characteristic may be formed.

In the invention, the total area of the light shielding regions occupy 40% or more in the total area of the circular light shielding means, and 20 μm or less in the diameter of the circles arranged irregularly, so that a high reflectivity may be obtained.

In the invention, the reflection electrodes are formed on the insulating film possessing plural bumps only in the reflection electrode forming region not overlapping with the distribution electrodes. If defective forming of the bumps on the insulating film occurs, since bumps are not formed on the distribution electrodes, insulation failure between the reflection electrodes and distribution electrodes does not occur.

As mentioned above, the insulating film at the end of the reflection electrodes is flat, not forming bumps, so that patterning of reflection electrodes may be favorable. Therefore, the display quality is enhanced. The bumps are formed irregularly, and the shape of the bumps is tapered with spherical front ends, and the bumps are formed in one or two or more types different in size, and therefore the intensity of light scattering in the direction vertical to the display screen is increased for the incident light from all angles, and the display luminance is improved, and the display contrast is heightened, so that the display quality may be enhanced.

The arrangement pattern of bumps of the invention may be identical on each reflection electrode, and only one type of arrangement pattern is enough for forming bumps, and it is easy to form bumps.

Further according to the invention, since the reflected light in other portions than the reflection electrode is shielded by forming a light shielding film possessing an electric insulating property on one substrate, leak of light unnecessary for display may be prevented, and a reflection type liquid crystal display device excellent in contrast is realized. In addition, as compared with the case of forming a light shielding film on the other substrate, a wider margin is allowed when pasting the substrates, and lowering of the aperture rate due to deviation in pasting may be decreased, so that a bright display may be realized.

According to the invention, on the insulating film forming along the bumps, on the irregular plural bumps obtained by exposing, developing and heating the photosensitive resin, the reflector made of metal thin film is formed along the bumps of the insulating film. The shape of the reflector is determined by the shape of the photosensitive resin. The photosensitive resin may be controlled easily, uniformly and at high reproducibility, and hence the reflector having excellent reflective characteristics may be easily formed, and the display quality of the reflection type liquid crystal display device is enhanced.

Since the reflector is formed along the plural bumps arranged irregularly, a favorable reflective characteristic is obtained, and the display quality of the reflection type liquid crystal display device is much enhanced.

If the reflector is an electrode which is used as a display picture element, parallax is eliminated, and hence the display quality of the reflection type liquid crystal display device is further enhanced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE INVENTION

Figure 1:
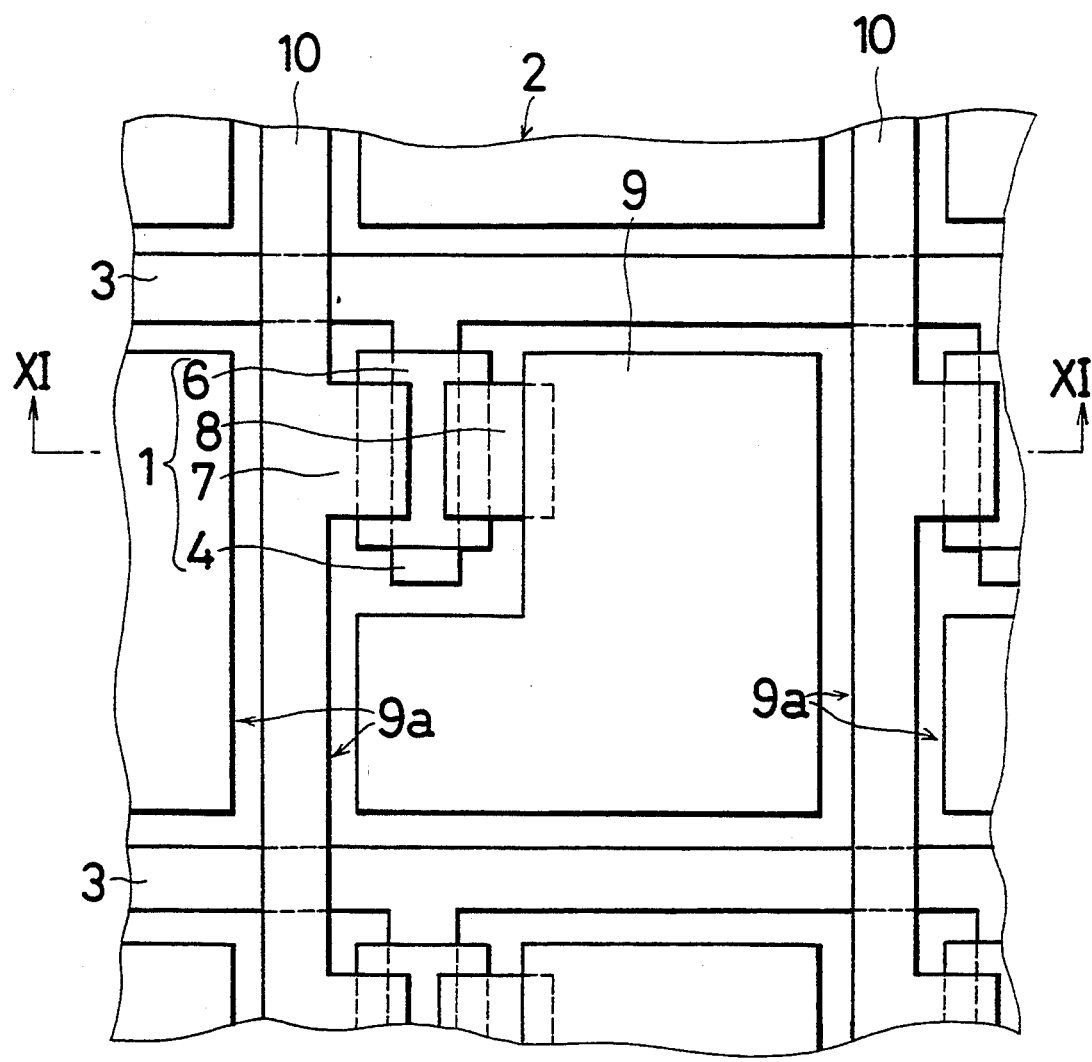
FIG. 1 is a plan view of a substrate 2 having a thin film transistor 1 which is a switching element used in active matrix system.
Figure 2:
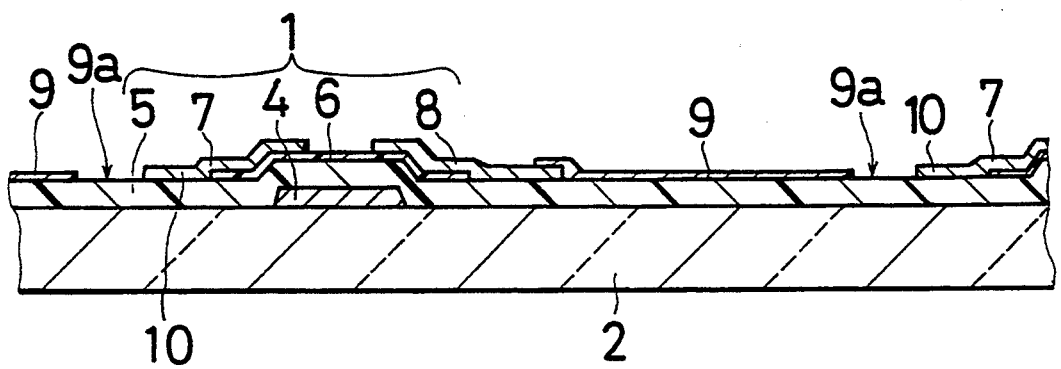
FIG. 2 is a sectional view of XI—XI in FIG. 1.
Figure 3:
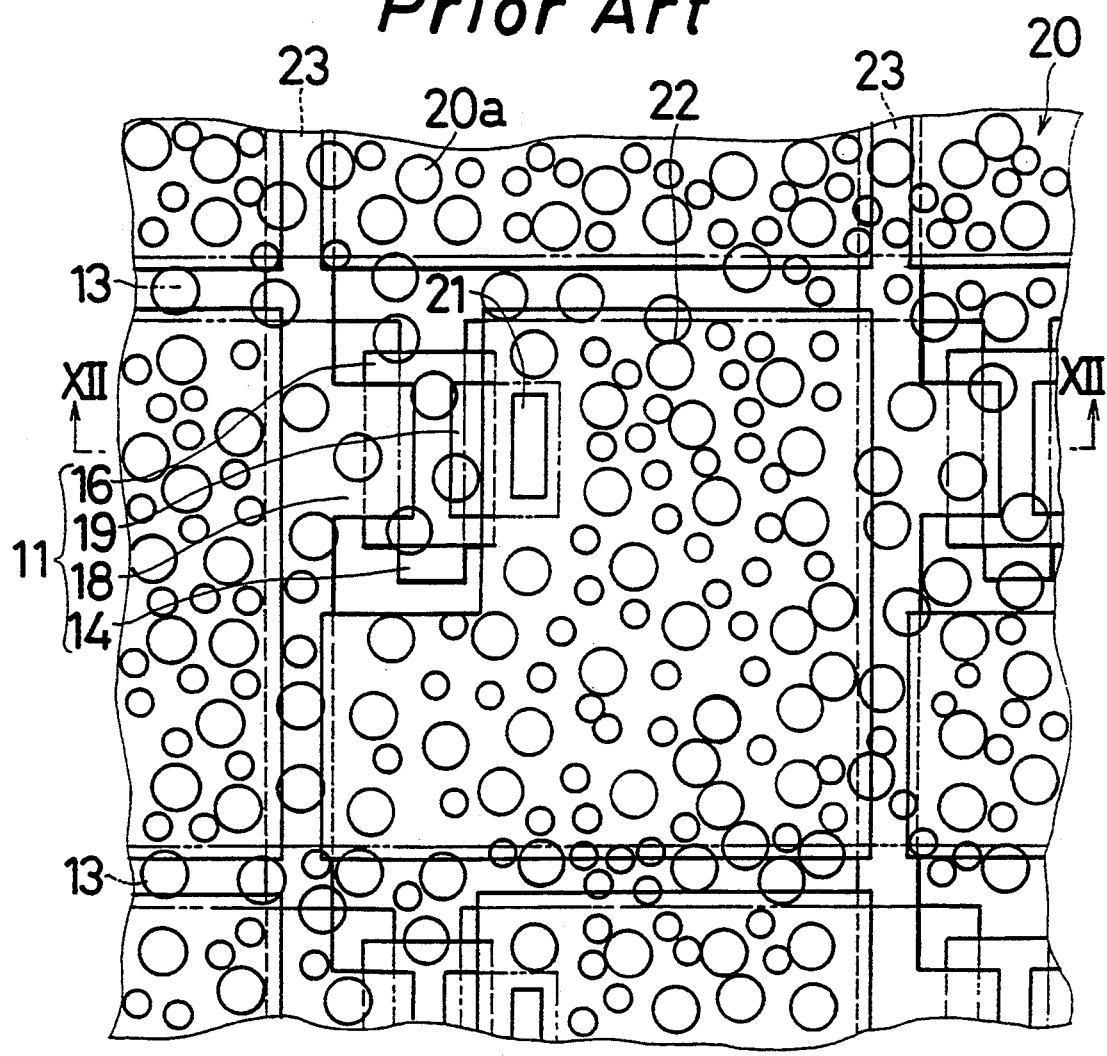
FIG. 3 is a plan view of a substrate 12 having a thin film transistor 11 which is a switching element used in active matrix system.
Figure 4:
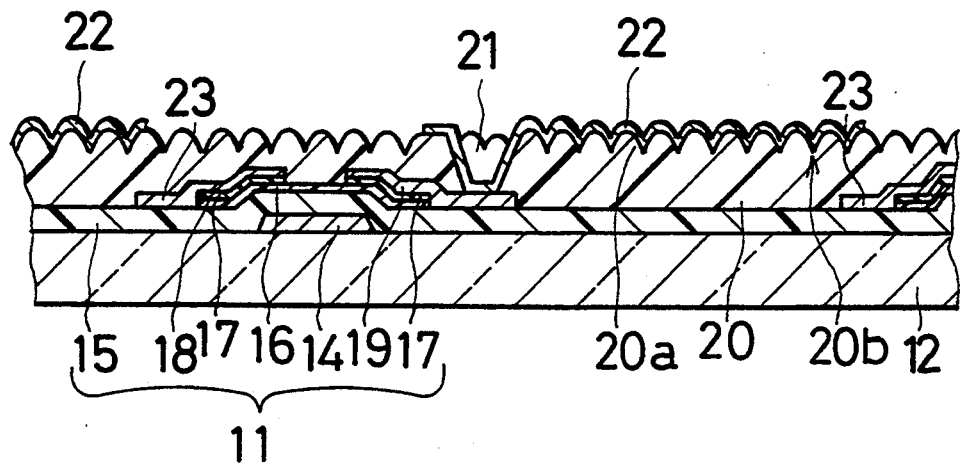
FIG. 4 is a sectional view of XII—XII in FIG. 3.

Now referring to the drawing, preferred embodiments of the invention are described below.

Figure 5:
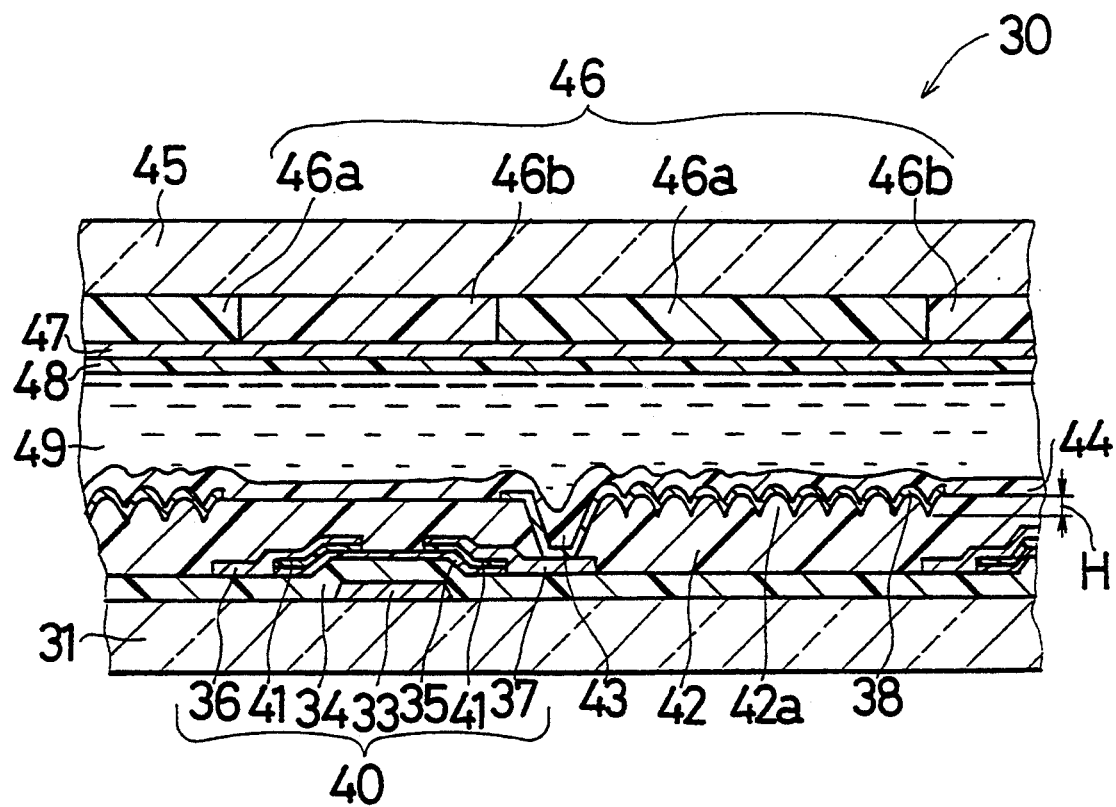
FIG. 5 is a sectional view of a reflection type liquid crystal display device 30 as an embodiment of the invention.
Figure 6:
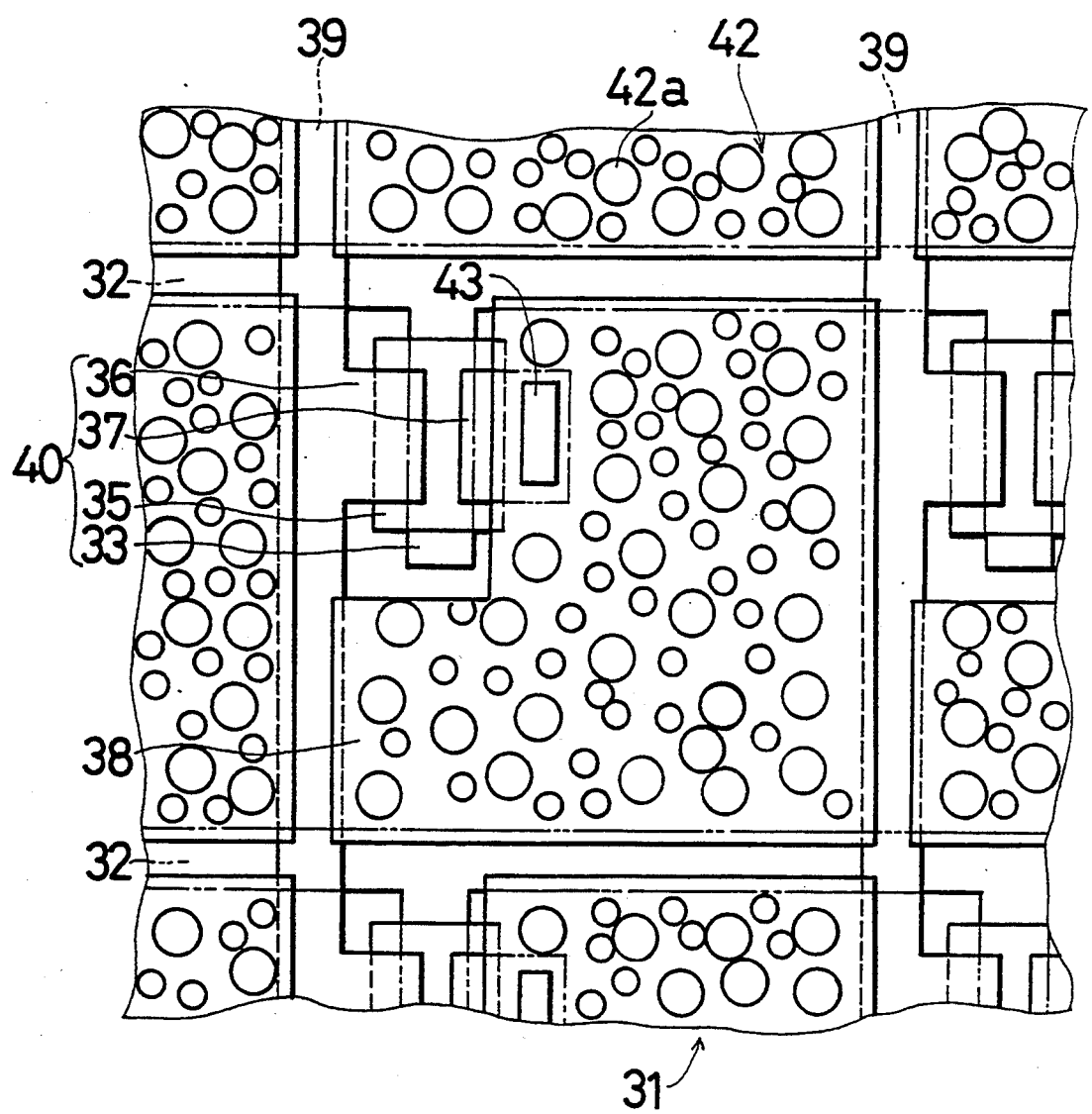
FIG. 6 is a plan view of a substrate 31 shown in FIG. 5.

FIG. 5 is a sectional view of a reflection type liquid crystal display device in an embodiment of the invention, and FIG. 6 is a plan view of a substrate 31 shown in FIG. 5. On an insulating substrate 31 made of glass or the like, plural gate bus wirings 32 made of chromium, tantalum or the like are disposed parallel mutually, and gate electrodes 33 are branched off from the gate bus wirings 32. The gate bus wirings 32 function as scanning lines.

Covering the gate electrode 33, a gate insulating film 34 made of silicon nitride (SiNx), silicon oxide (SiOx) or the like is formed on the entire surface of the substrate 31. On the gate insulating film 34 above the gate electrode 33, a semiconductor layer 35 made of amorphous silicon (a-Si), polycrystalline silicon, CdSe or the like is formed. At both ends of the semiconductor layer 35, contact electrodes 41 made of a-Si or the like are formed. On one contact electrode 41, a source electrode 36 made of titanium, molybdenum, aluminum or the like is superposed, and on the other contact electrode 41 is superposed a drain electrode 37 made of titanium, molybdenum, aluminum or the like, same as the source electrode 36.

As shown in FIG. 6, source bus wirings 39 crossing the gate bus wirings 32 across the gate insulating film 34 are connected to the source electrode 36. The source bus wirings 39 function as signal lines. The source bus wirings 39 are also made of same metal as the source electrode 36. The gate electrode 33, gate insulating film 34, semiconductor layer 35, source electrode 36, and drain electrode 37 compose a thin film transistor (TFT) 40, and this TFT 40 possesses the function of switching element.

Covering the gate bus wirings 32, source bus wirings 39 and TFT 40, an organic insulating film 42 is formed on the entire surface on the substrate 31. In the region for forming reflection electrodes on the organic insulating film 42, bumps 42a of height H in a tapered form with spherical ends are formed, and contact holes 43 are formed in the parts of the drain electrodes 37. In relation to the forming method of the organic insulating film 42, process problems for forming contact holes 43 therein, and to decrease fluctuations of cell thickness when forming the liquid crystal display device 30, the height H of the bumps 42a is desired to be 10 μm or less. (Generally, the cell thickness is 10 μm or less.) On the bumps 42a forming region of the organic insulating film 42, reflection electrodes 38 composed of aluminum, silver or the like are formed, and the reflection electrodes 38 are connected with drain electrodes 37 in the contact holes 43. An orientation film 44 is formed further thereon.

A color filter 46 is formed on a substrate 45. A magenta or green filter 46a is formed at the position confronting the reflection electrode 38 on the substrate 31 of the color filter 46, and a black filter 46b is formed at the position not confronting the reflection electrode 38. On the entire surface of the color filter 46, a transparent electrode 47 made of ITO (indium tin oxide) or the like is formed, and an orientation film 48 is formed further thereon.

The both substrates 31, 45 are adhered face to face together so that the reflection electrodes 38 and filters 46a may coincide with each other, and liquid crystal 49 is injected between them, and the reflection type liquid crystal display device 30 is completed.

Figure 7:
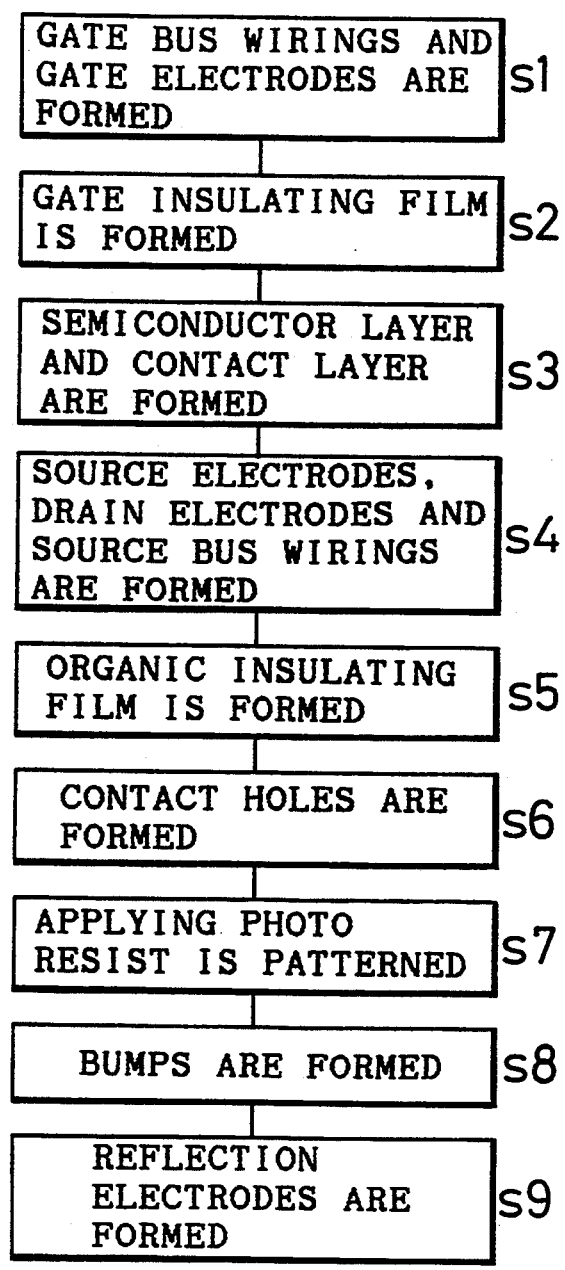
FIG. 7 is a process chart for explaining the method for forming a reflection electrode 38 having asperities on the substrate 31 shown in FIG. 5 and FIG. 6.
Figure 8:
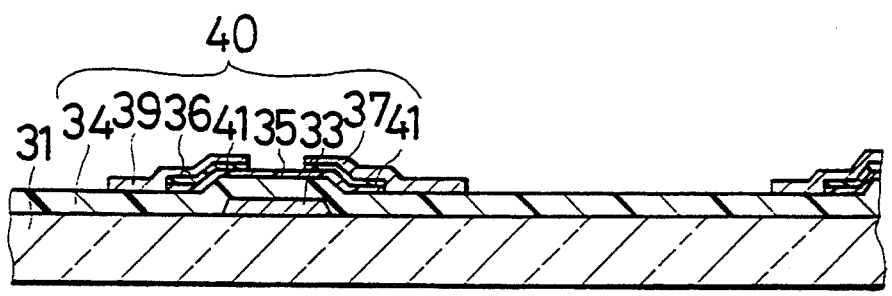
FIGS. 8(1), 8(2), 8(3) and 8(4) are a sectional view for explaining the forming method in FIG. 7.
Figure 8:
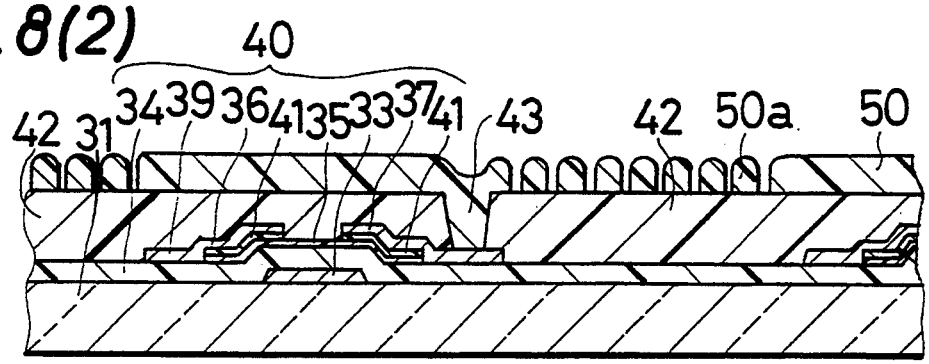
Figure 8:
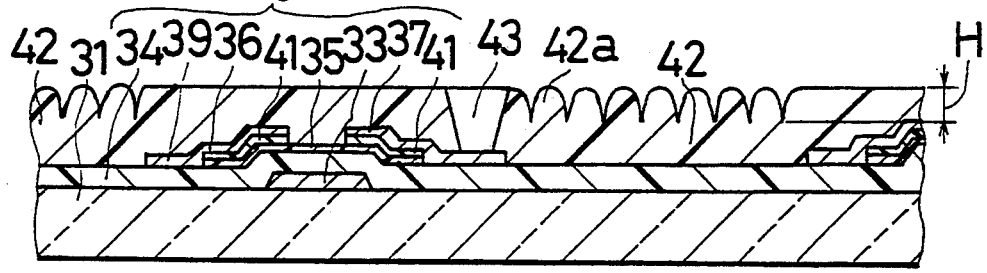
Figure 8:
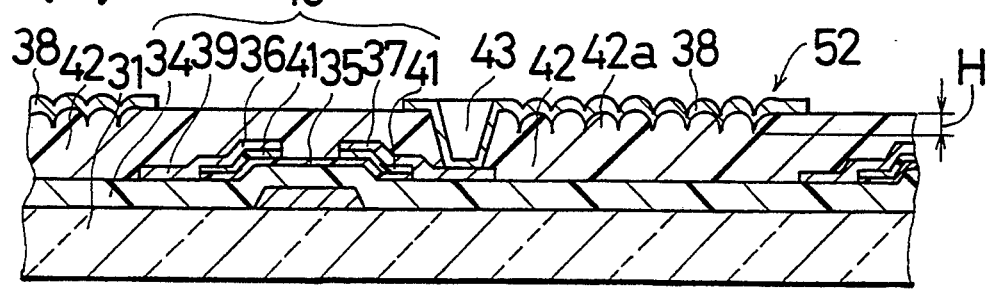
Figure 9:
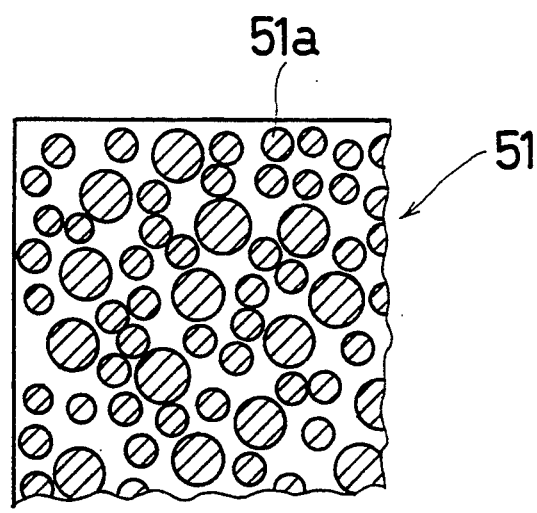
FIG. 9 is a plan view of a mask 51 used at step s7 in FIG. 7.

FIG. 7 is a process chart for explaining the method of forming undulated reflection electrodes 38 shown in FIG. 5 and FIG. 6 on the substrate 31, and FIG. 8 is a sectional view for explaining the forming method in FIG. 7, and FIG. 9 is a plan view of a mask 51 used at step s7 in FIG. 7. FIG. 8(1) relates to step s4 in FIG. 7, FIG. 8(2) relate to step s7 in FIG. 7, FIG. 8(3) relates to step s8 in FIG. 7, and FIG. 8(4) relates to step s9 in FIG. 7.

At step s1, a tantalum metal layer of 3000 Å in thickness is formed on an insulating substrate 31 made of glass or the like by sputtering method, and this metal layer is patterned by photolithographic method and etching, and gate bus wirings 32 and gate electrodes 33 are formed. At step s2, a gate insulating film 34 made of silicon nitride in a thickness of 4000 Å is formed by plasma CVD method.

At step s3, a 1000 Å thick a-Si layer as semiconductor layer 35, and a 400 Å thick n+ type a-Si layer as contact layer 41 are formed continuously in this order. By pattering the formed n+ a-Si layer and a-Si layer, the semiconductor layer 35 and contact layer 41 are formed. At step s4, by forming a 2000 Å thick molybdenum metal on the entire surface of the substrate 31 by sputtering method, the molybdenum metal layer is patterned to form source electrodes 36, drain electrodes 37, and source bus wirings 39, thereby completing a TFT 40. FIG. 8(1) is a sectional view of a substrate 31 forming the TFT 40 after the end of processing up to step s4.

At step s5, polyimide resin is formed in a thickness of 2 μm on the entire surface on the substrate 31 forming the TFT 40, and an organic insulating film 42 is formed. At step s6, contact holes 43 are formed in the organic insulating film 42 by photolithorgraphy and dry etching method. At step s7, applying a photo resist 50 on the organic insulating film 42, bumps 50a are patterned in the region for forming reflection electrodes 38 by using the mask 51 shown in FIG. 9. To smooth out the corners of the bumps 50a, heat treatment is conducted in a range of 120° C. to 250° C. In this embodiment, heat treatment at 200° C. was performed for 30 minutes. FIG. 8(2) is a sectional view of the substrate 31 at the end of processing up to step s7. In the mask 51, circular light shielding regions 51a indicated in shaded area in FIG. 9 are formed irregularly in the region for forming the reflection electrodes 38.

At step s8, as shown in FIG. 8(3), by etching the organic insulating film 42 according to the photo resist 50, bumps 42a in a height H of 0.5 μm are formed. At this time, since the photo resist 50 has been heated to smooth out the corners of the bumps 50a, the bumps 42a are also formed in a smooth form free of corners. Besides, the contact holes 43 and organic insulating film 42 on the TFT 40 are protected with photo resist 50, and are not etched.

At step s9, an aluminum layer is formed on the entire surface on the organic insulating film 42, and reflection electrodes 38 are formed on the bumps 42a as shown in FIG. 8(4). The substrate 31 in this state is the substrate 52 having reflection electrodes 38. The reflection electrodes 38 are connected to the drain electrodes 37 of the TFT 40 through contact holes 43 formed in the organic insulating film 42.

It has been confirmed that the shape of the bumps 42a on the organic insulating film 42 can be controlled by the shape of the mask 51, thickness of photo resist 50, and time of dry etching.

After the above steps, the substrate 52 having reflection electrodes 38 is obtained. In this manufacturing process, by extending the dry etching time of the organic insulating film 42, a substrate 31 having bumps 42a in height H of 1 μm may be also obtained, and the substrate 31 having reflection electrodes 38 in height H of 1 μm is supposed to be substrate 59.

The electrodes 47 formed on the other substrate 45 shown in FIG. 5 are composed of, for example, ITO, and 1000 Å in thickness. The orientation films 44, 48 are formed by applying and baking polyimide or the like. Between the substrates 31 and 45, a space is formed for packing with liquid crystal 49 by, for example, screen printing of adhesive sealant not shown mixing in a 7 μm spacer, and the liquid crystal 49 is injected by evacuating the space. As the liquid crystal 49, for example, a guest-host liquid crystal mixing black pigment (Merck, tradename ZLI2327) is mixed with 4.5% of optical active substance (Merck, tradename S811).

Figure 10:
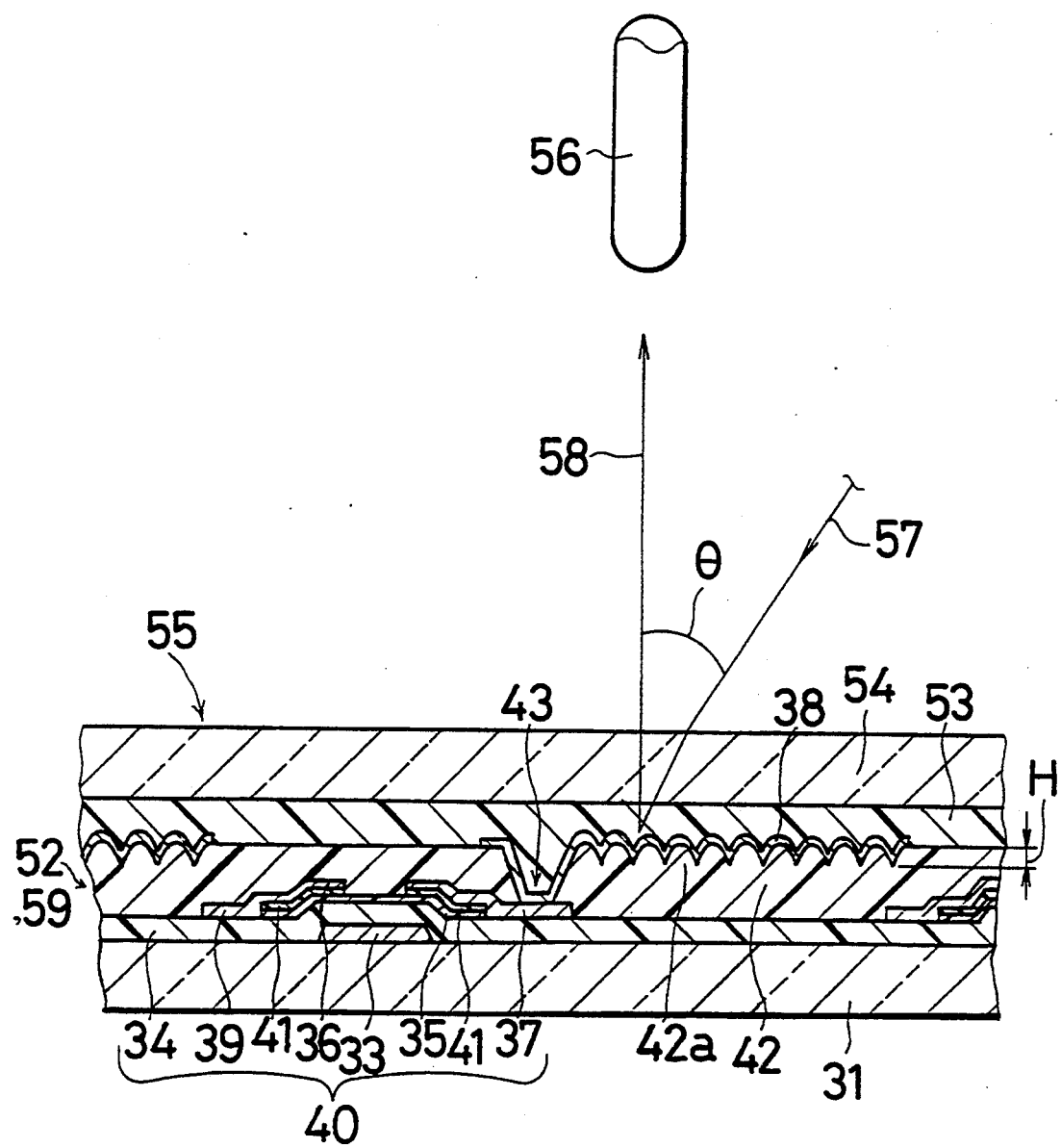
FIG. 10 is a sectional view showing a measuring method of reflective characteristic of a substrate 52 having a reflection electrode 38.

FIG. 10 is a sectional view showing a method for measuring the reflective characteristics of the substrates 52, 59 having reflection electrodes 38. A glass substrate 54 is adhered tightly to the substrates 52, 59 having reflection electrodes 38 through a ultraviolet setting adhesive resin 53, and a measuring apparatus 55 is formed. In the reflection type liquid crystal display device 30, since the refractive index of the substrate 45 and liquid crystal 49 is both about 1.5, the ultraviolet setting adhesive resin 53 and substrate 54 with refractive index of about 1.5 are used. On the substrate 54, a photo multimeter 56 for measuring the light intensity is disposed. The photo multimeter 56 is fixed in the normal direction of the substrate 31 so as to detect the scattered light 58 reflecting in the normal direction of the substrate 31, out of the incident light 57 entering the reflection electrodes 38 at an incident angle 8 to the to the substrate 31.

By measuring the scattered light 58 by the reflection electrodes 38 by varying the incident angle $\theta$ of the incident light 57 entering the measuring apparatus 55, the reflective characteristic of the reflection electrodes 38 is obtained. This result of measurement has been confirmed to be same as the reflective characteristic on the boundary of the reflection electrodes 38 in the reflection type liquid crystal display device 30 and the liquid crystal layer 49 or the like.

Figure 11:
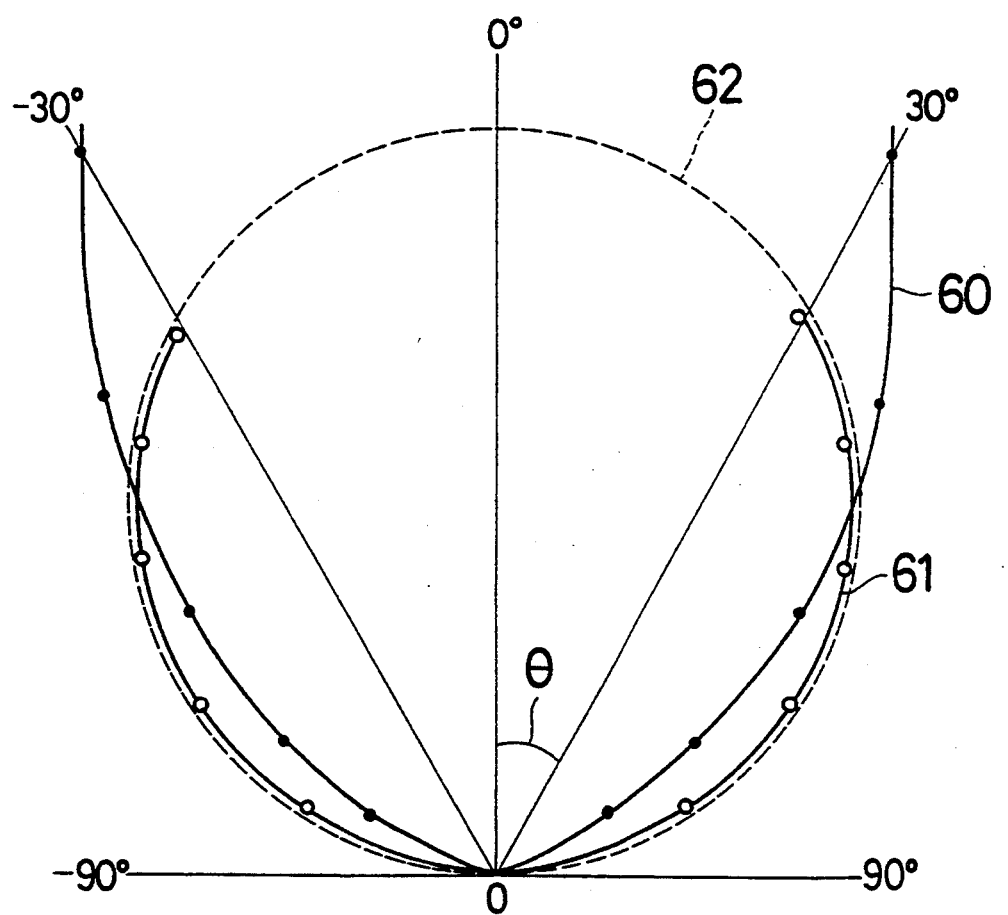
FIG. 11 is a graph showing reflective characteristics 60, 61 of reflection type active matrix substrates 52, 59 of the invention.

FIG. 11 is a graph showing the reflective characteristics of the substrates 52, 59 having the reflection electrodes in the embodiment. The reflective characteristic of the substrate 52 is represented by the curve 60, while the reflective characteristic of the substrate 59 is indicated by the curve 61. In FIG. 11, the reflection intensity of the light entering at an incident angle $\theta$ is expressed as the distance from the origin O in the direction of angle $\theta$ to the line of $\theta=0°$. The curve 62 indicated by broken line in FIG. 11 refers to the reflective characteristic measured of standard white panel (magnetium oxide). The curve 60 representing the reflective characteristic of the substrate 52 is large in the reflectivity in the normal direction of the substrate when the incident angle is small, and is small in the reflectivity in the normal direction when the incident angle is large. As compared with this directivity, the curve 61 showing the reflective characteristic of the substrate 59 is known to have a similar characteristic to the curve 62 showing the reflective characteristic of the standard white panel.

Thus, by controlling the dry etching time, the reflective characteristics 60, 61 can be controlled. Besides, by varying the rate of occupation of the light shielding region 51a of the mask 51, the size of the normal reflection component may be controlled.

The reflectivity was measured by putting the photo multimeter 56 on the reflection type liquid crystal display device 30. The reflectivity is obtained by determining the ratio of the intensity of the diffuse light 58 in the normal direction of the reflection type liquid crystal display device 30, to the diffuse light 58 in the normal direction on the standard white panel at the incident angle $\theta$ of the incident light 57 of 30°. When voltage was applied, the reflectivity of the reflection type liquid crystal display device 30 to the incident light of the incident angle $\theta=30°$ was about 20%, which was considerably bright, and the contrast ratio was 5.

Figure 12:
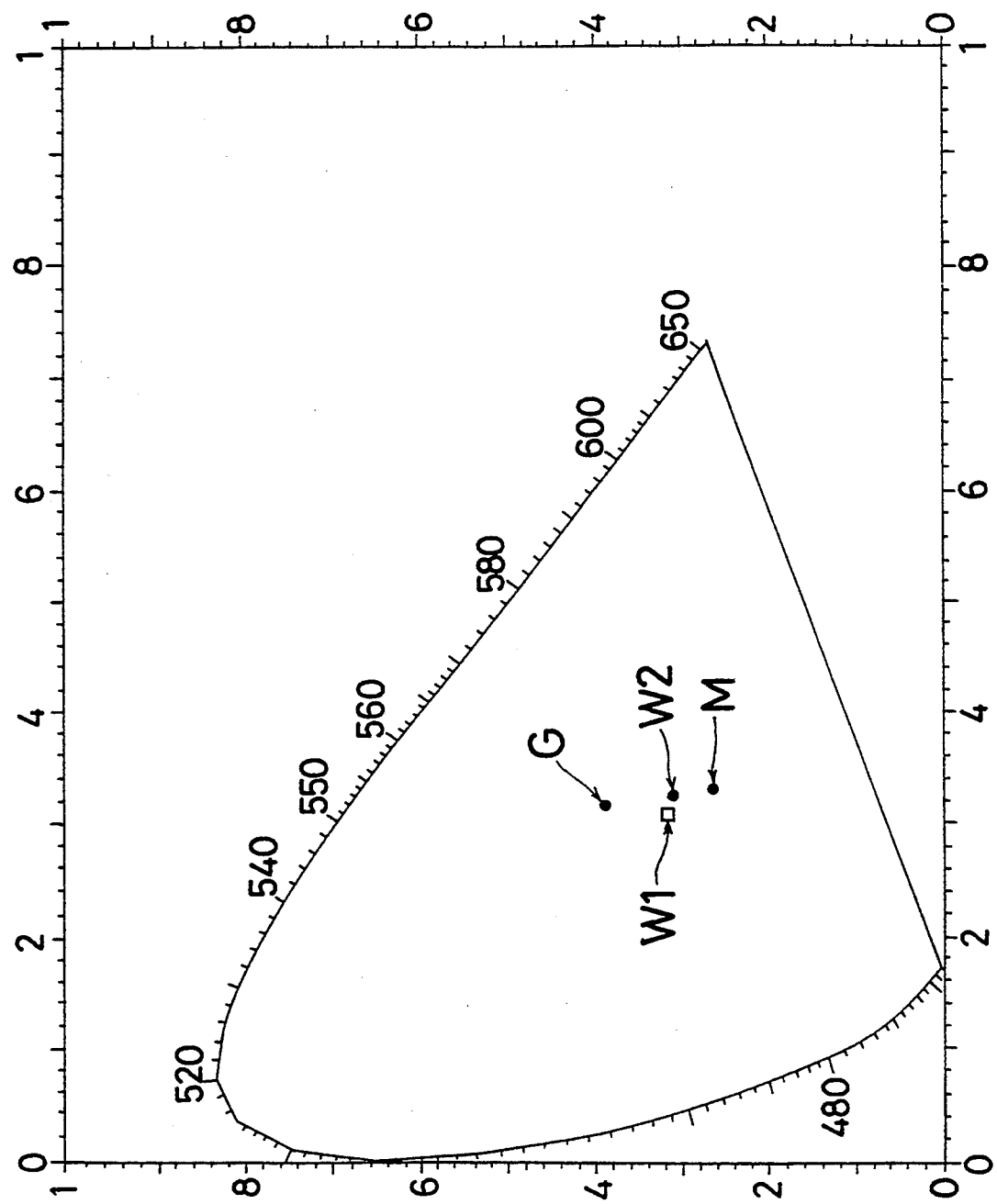
FIG. 12 is a graph of CIE chromaticity chart of the colors of reflected light corresponding to a white light source in a reflection type liquid crystal display device 30 in an embodiment of the invention.

FIG. 12 is a graph of CIE chromaticity chart of the color of reflected light to the white light source of the reflection type liquid crystal display device 30 in an embodiment of the invention. Point W1 indicates a white light source, point W2 denotes the white color displayed by the reflection type liquid crystal display device 30, point G represents the green color displayed by the reflection type liquid crystal display device 30, and point M indicates the magenta displayed by the reflection type liquid crystal display device 30. It is known that the point W2 indicating the white color of the reflection type liquid crystal display device 30 is close to point W1 indicating the white light source.

In the reflection type liquid crystal display device 30 of the embodiment, since the surface forming the reflection electrodes 38 is positioned at the liquid crystal 49 side, parallax is eliminated, and a favorable display screen is obtained. Besides, in the embodiment, since the reflection electrodes 38 having asperities are disposed at the positions of the liquid crystal 49 layer side or nearly adjacent to the liquid crystal 49 layer, the height H of the bumps 42a is smaller than the cell thickness, and the slant angle of the bumps is as moderate as not to disturb the orientation of the liquid crystal.

In the foregoing embodiment, meanwhile, the organic insulating film 42 was patterned by dry etching method, but wet etching method using alkaline solution may be also possible when the organic insulating film 42 is a polyimide resin. Instead of polyimide resin as the organic insulating material 42, acrylic resin or other organic material may be also used. In the embodiment, glass and other transparent material is used for the substrates 31, 45, but similar effects are obtained by using opaque materials such as silicon substrate, and in this case it is advantageous because the circuit may be integrated on the substrate.

In the embodiment, incidentally, the display mode is represented by the phase transition type guest-host mode, but it is not limitative, and similar effects are obtained by other modes, including other light absorption mode such as two-layer guest-host method, light scattering type display mode such as high polymer dispersion type liquid crystal display device, and double refraction display mode used in ferrodielectric liquid crystal display device. Instead of the TFT 40 used as the switching element in the embodiment, the invention may be also applied to an active matrix substrate using MIM (metal-insulator-metal) element, diode, varistor, etc.

Figure 13:
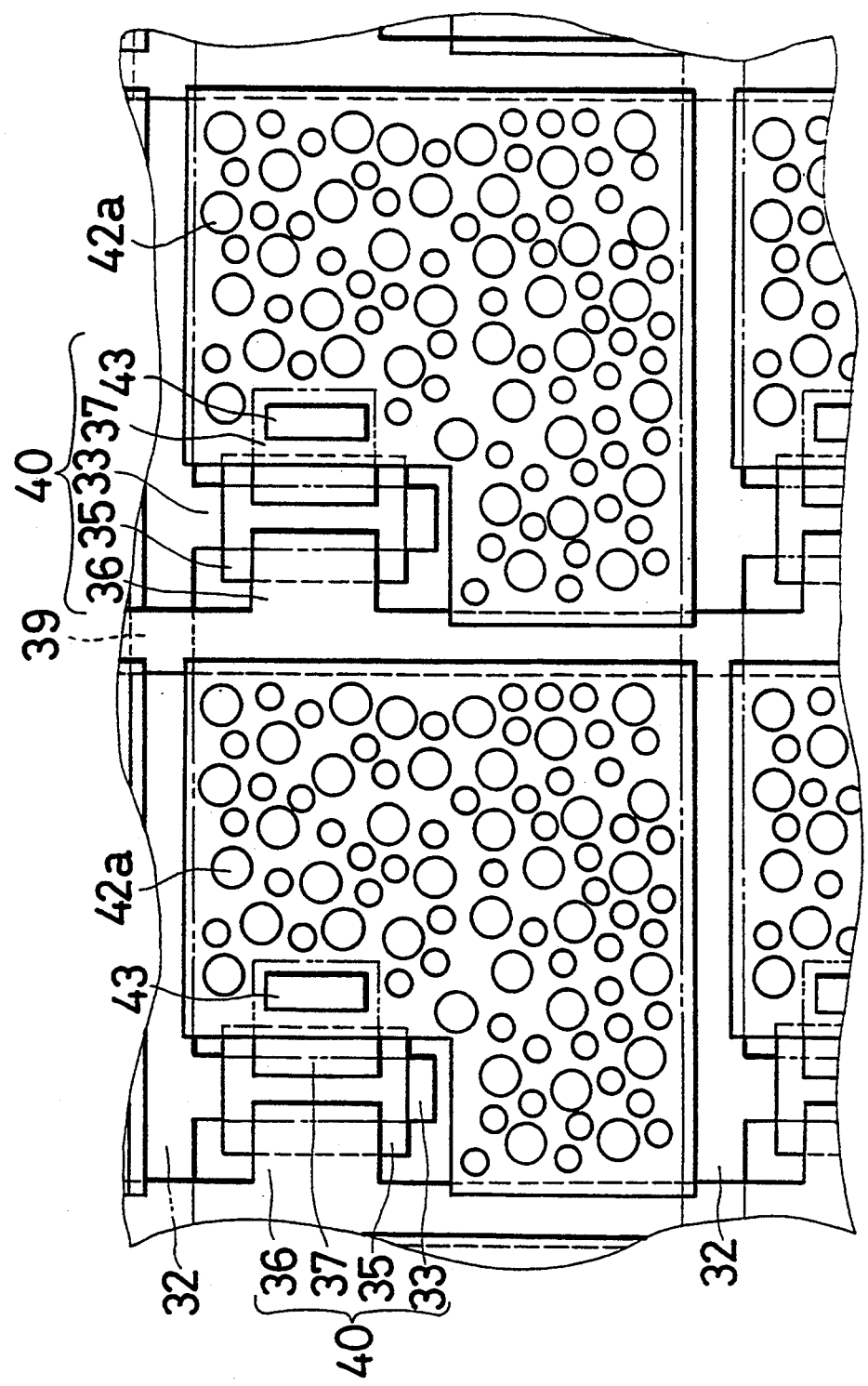
FIG. 13 is a plan view of a substrate 31 showing other embodiment of the invention.

FIG. 13 is a plan view of a substrate 31 in other embodiment of the invention. On the reflection electrodes 38, irregular circular bumps 38a are formed irregularly through bumps 42a formed on the organic insulating film 42. However, the irregularity of the bumps 38a of the reflecting electrode 38 is identical in any reflection electrode 38. This is because the light shielding region 51a of same pattern is formed at the position corresponding to each reflection electrode 38 of the photo mask 51 used in forming the bumps 42a on the organic insulating film 42.

Although different patterns may be designed at positions corresponding to the reflection electrodes 38 of the photo mask 51 for forming the bumps 42a, the quantity of data required for forming patterns increased in such method, thereby making it difficult to produce photo mask 51. In this embodiment, however, since identical patterns are formed on the photo mask 51 at the positions corresponding to the reflection electrodes 38, it is enough to form a pattern corresponding to one reflection electrode 38 only, and it is easier to manufacture the photo mask 51.

The bumps 42a shown in FIG. 13 are formed by using a mask pattern having two circles arranged irregularly. The size of the bumps 38a is, for example, 5 μm and 10 μm in diameter of circles, and 0.6 μm in height, and they are formed at random only in a pattern corresponding to one reflection electrode 38, and the remaining picture elements are its repeated patterns. For example, a monochromatic reflection type liquid crystal display device with picture element size of 300 μm×300 μm, number of picture elements of 320×240, and diagonal size of 5 inches was fabricated.

The constitution of the reflection type liquid crystal display device 30, method of forming the bumps 40a, display mode and others are same as in the foregoing embodiment. As a result, the display at the time of full lighting was a favorable white color, free from colors due to interference with adjacent picture elements.

In the case of a greater number of reflection electrodes 38 and smaller pitches of the reflection electrodes 38, in particular, where the interference color with the picture elements formed by the adjacent reflection electrodes 38 matters, the photo mask 31 may be formed by combining two or more patterns.

Thus, according to this embodiment, since asperities are formed only in the portions of the reflection electrodes, insulation failure of source bus wirings and reflection electrodes does not occur, and since the organic insulating film in the end portions of the reflection electrodes is free from asperities and is flat, patterning failure does not occur, and the display quality of the reflection type liquid crystal display device is enhanced. Besides, the bumps formed in the reflection electrode parts are arranged irregularly, and are tapered with spherical ends, shaped in one or two or more types differing in size, and therefore the intensity of the diffuse light in the normal direction of the reflection type liquid crystal display device is enhanced.

Also in the embodiment, since the arrangement pattern of the bumps is identical in each reflection electrode, it is easy to form bumps.

Figure 14:
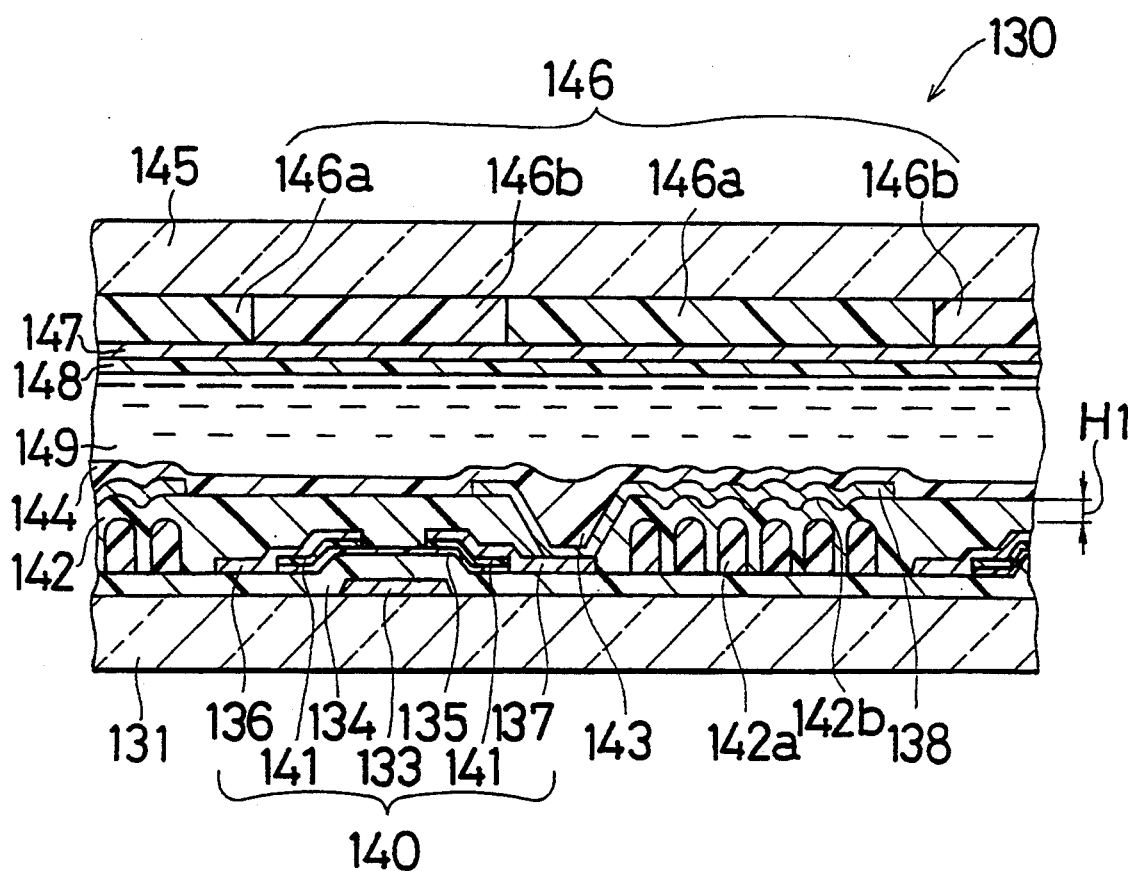
FIG. 14 is a sectional view of a reflection type liquid crystal display device 30 in other different embodiment of the invention.
Figure 15:
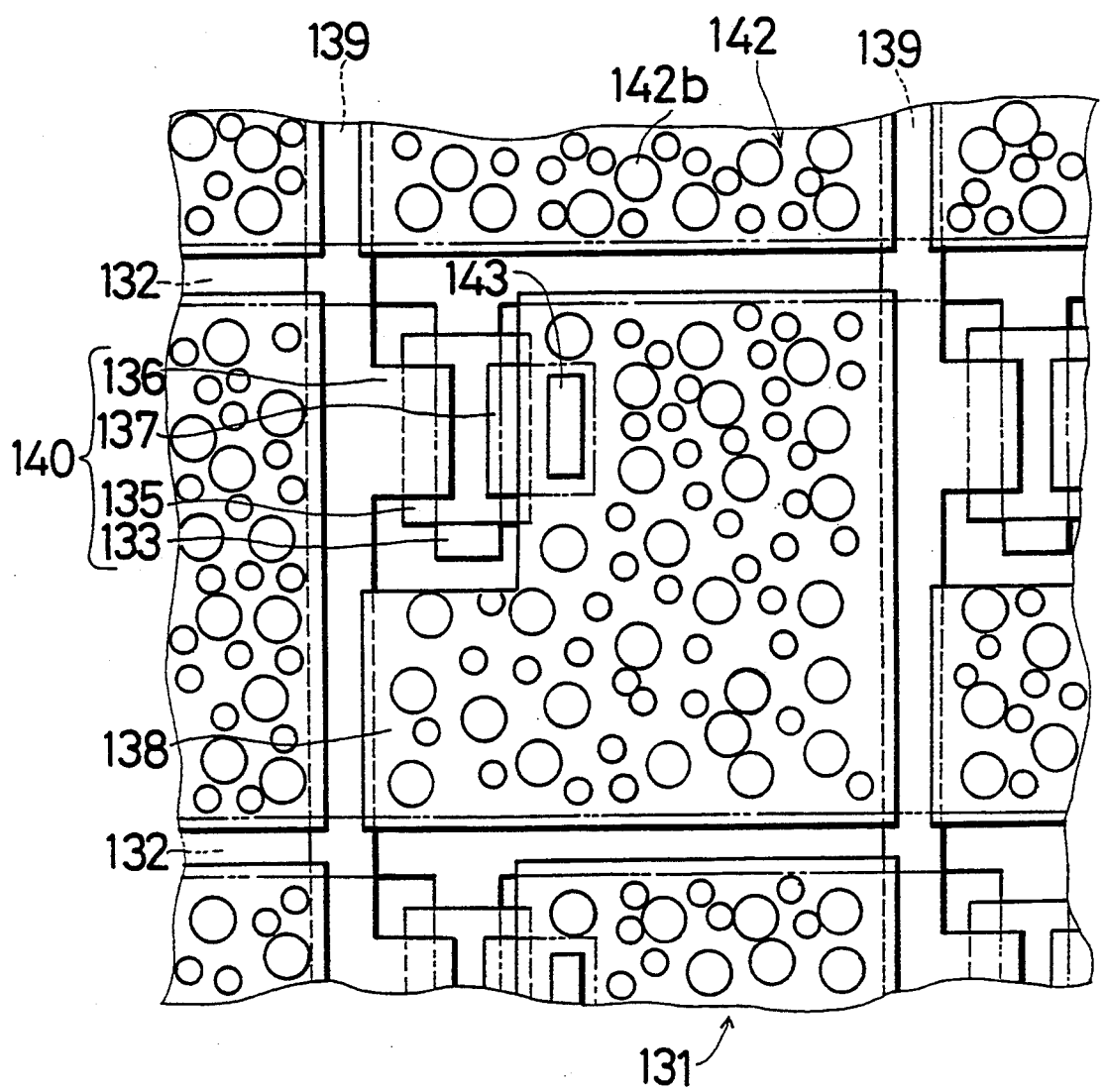
FIG. 15 is a plan view of a substrate 131 shown in FIG. 14.

FIG. 14 is a sectional view of a reflection type liquid crystal display device 130 in a further different embodiment of the invention, and FIG. 15 is a plan view of a substrate 131 shown in FIG. 14. On an insulating substrate 131 made of glass or the like, plural gate bus wirings 132 made of chromium, tantalum, or the like are disposed parallel mutually, and gate electrode 133 are branched off from the gate bus wirings 132. The gate bus wirings 132 function as scanning lines.

Covering the gate electrode 133, a gate insulating film 134 made of silicon nitride (SiNx), silicon oxide (SiOx), or the like is formed on the entire surface on the substrate 131. On the gate insulating film 134 above the gate electrodes 133, a semiconductor layer 135 composed of amorphous silicon (a-Si), polycrystalline silicon, CdSe or the like is formed. At both ends of the semiconductor layer 135, contact electrodes 141 composed of a-Si or the like are formed. On one contact electrode 141 is superposed a source electrode 136 made of titanium, molybdenum, aluminum or the like, and on the other contact layer 141 is superposed a drain electrode 137 made of titanium, molybdenum, aluminum or the like, same as the source electrode 136.

As shown in FIG. 15, source bus wirings 139 crossing the gate bus wirings 132 across the gate insulating film 134 are connected to the source electrodes 136. The source bus wirings 139 function as signal lines. The source bus wirings 139 are also made of the same metal as the source electrodes 136. The gate electrodes 133, gate insulating film 134, semiconductor layer 135, source electrodes 136, and drain electrodes 137 compose a thin film transistor (TFT) 140, and the TFT 140 possesses the function of switching element.

In the region of forming the reflection electrodes 138, plural bumps 142a are formed irregularly. Covering the gate bus wirings 132, source bus wirings 139, TFT 140 and bumps 142a, an organic insulating film 142 is formed on the entire surface of the substrate 131. Bumps 142b corresponding to the bumps 142a are formed on the organic insulating film 142. Contact holes 143 are formed in the parts of the drain electrodes 137. To decrease the fluctuations of the cell thickness when forming the liquid crystal display device 130, the height H1 of the bumps 142b is desired to be smaller than the thickness of the cell or 10 μm or less (generally, the cell thickness is 10 μm or less). The pitch of the bumps 142a is desired to be 100 μm or less. On the organic insulating film 142 forming the bumps 142a, reflection electrodes 139 composed of aluminum, silver or the like are formed, and the reflection electrodes 138 are connected to the drain electrodes 137 in the contact holes 143. Furthermore, an orientation film 144 is formed thereon.

The reflection electrodes 138 are formed so as to be superposed on part of the gate bus wirings 132 and part of source bus wirings 139 through the organic insulating film 142 as shown in FIG. 15. Accordingly, the area of the reflection electrodes 138 may be increased, and the aperture rate of the display screen is larger, and a bright display is realized. To eliminate patterning failure of the reflection electrodes 138, bumps 142a may not be formed in the end portions of the reflection electrodes 138. If insulation failure of the reflection electrodes 138, gate bus wirings 132 and source bus wirings 139 occurs, bumps 142a may not be formed in the superposing parts.

A color filter 146 is formed on the substrate 145. A magenta or green filter 146a is formed at a position corresponding to the reflection electrodes 138 of the substrate 131 of the color filter 146, and a black filter 146b is formed at a position not corresponding to the reflection electrode 138. On the entire surface of the color filter 146, a transparent electrode made of ITO (indium tin oxide) or the like is formed, and an orientation film 148 is formed further thereon.

The both substrates 131, 145 are glued face to face so that the reflection electrodes 138 and filter 146a may coincide, and liquid crystal 149 is injected between them to complete the reflection type liquid crystal display device 130.

Figure 16:
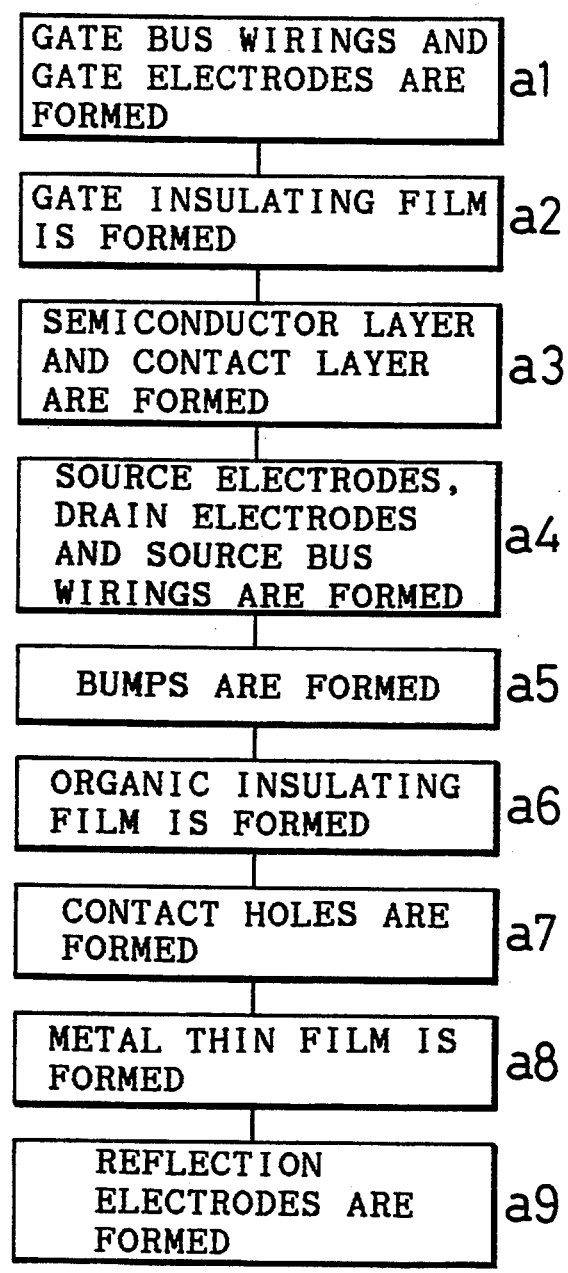
FIG. 16 is a process chart for explaining a method of forming a reflection electrode 138 having bumps shown in FIG. 14 and FIG. 15.
Figure 17:
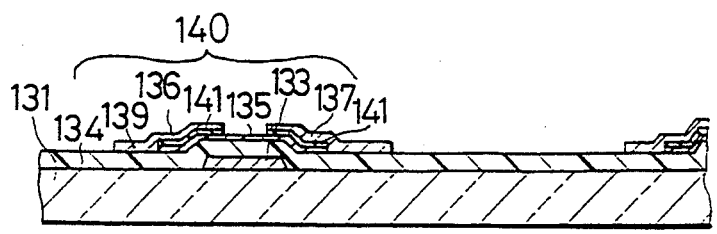
FIGS. 17(1), 17(2), 17(3), 17(4) and 17(5) are a sectional view for explaining the forming method in FIG. 16.
Figure 17:
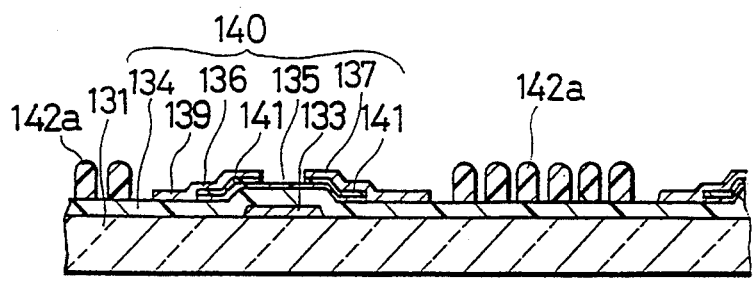
Figure 17:
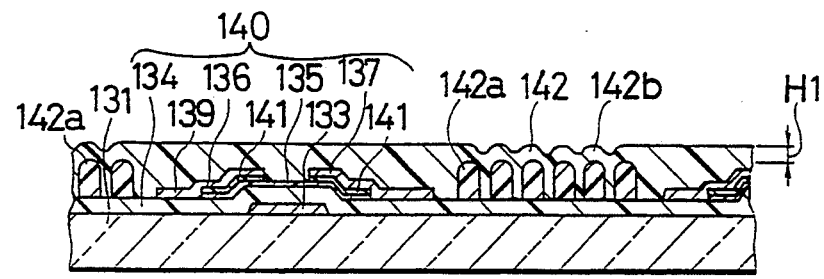
Figure 17:
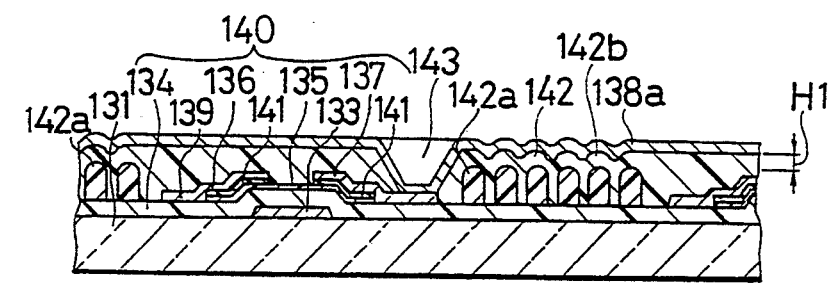
Figure 17:
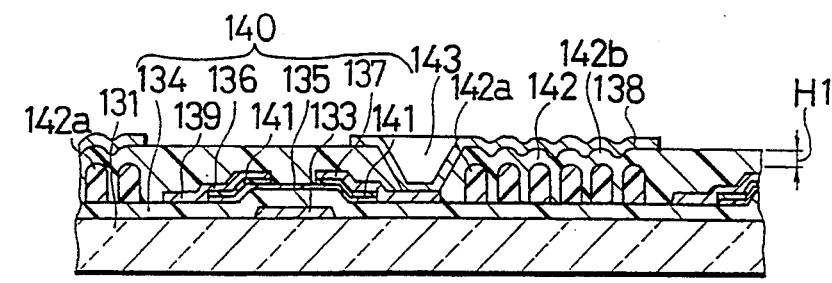
Figure 18:
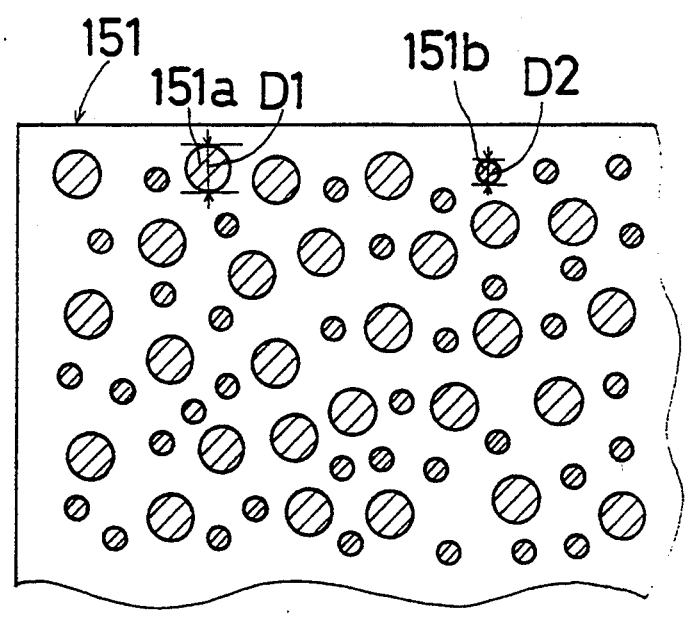
FIG. 18 is a plan view of a mask 151 used at step a5 in FIG. 16.

FIG. 16 is a process chart showing the method of forming reflection electrodes 138 having bumps as shown in FIG. 14 and FIG. 15 on the substrate 131, FIG. 17 is a sectional view for explaining the forming method shown in FIG. 16, and FIG. 18 is a plan view of a mask 151 used at step a5 in FIG. 16. FIG. 17(1) relates to step a4 in FIG. 16, FIG. 17(2) relate to step a5 in FIG. 16, FIG. 17(3) relates to step a6 in FIG. 16, FIG. 17(4) relates to step a8 in FIG. 16, and FIG. 17(5) relates to step a9 in FIG. 16.

At step a1, a tantalum metal layer in a thickness of 3000 Å is formed on the insulating substrate 131 made of glass or the like by sputtering method, and this metal layer is patterned by photolithography and etching to form gate bus wirings 132 and gate electrode 133. At step a2, a gate insulating film 134 made of silicon nitride in a thickness of 4000 Å is formed by plasma CVD method.

At step a3, a 1000 Å thick a-si layer as semiconductor layer 135, and a 400 Å thick n+ type a-Si layer as contact layer 141 are formed continuously in this order. By patterning the formed n+ type a-Si layer and a-Si layer, the semiconductor layer 135 and contact layer 141 are formed. At step a4, a 2000 Å thick molybdenum metal is formed on the entire surface of the substrate 131 by sputtering method, and by patterning the molybdenum metal layer, the source electrodes 136, drain electrodes 137, and source bus wirings 139 are formed, thereby completing the TFT 140. FIG. 17(1) is a sectional view of the substrate 131 forming the TFT 140 after the end of processing up to step a4.

At step a5, photo resist (OFPR-800) is applied in a thickness of 1200 Å on the whole surface of the substrate 141 forming the TFT 140, and bumps 142a are formed as shown in FIG. 17(2) by using the mask 151 shown in FIG. 18. In the mask 151, circular light shielding regions 151a, 151b indicated in shaded areas in FIG. 18 are irregularly formed in the region for forming reflection electrodes 138. The diameter D1 of the light shielding region 151a is formed longer than the diameter D2 of the light shielding region 151b. For example, D1 is 10 μm and D2 is 5 μm. The diameters D1, D2 are preferably 20 μm or less. In this embodiment, the mask 151 having two types of light shielding regions 151a, 151b is used, but the mask 151 is not limited to this version only. The light shielding region may be only one circle, or three or more circles. Afterward, by heat treatment, the bumps 142a are formed in a smooth form being rid of sharp corners as shown in FIG. 17(2).

At step a6, a polyimide resin is applied in a thickness of 1 μm on the entire surface of the substrate 131, and the organic insulating film 142 is formed as shown in FIG. 17(3). At step a7, contact holes 143 are formed in the organic insulating film 142 by photolithography and dry etching method.

At step a8, a metal thin film composed of aluminum is formed as shown in FIG. 17(4) on the entire surface of the organic insulating film 142 possessing bumps 142b, and at step a9, as shown in FIG. 17(5), the reflection electrodes 138 are patterned on the bumps 142b. The reflection electrodes 138 are connected to the drain electrodes 138 of the TFT 140 through the contact holes 143 formed in the organic insulating film 142. At the time of patterning of the reflection electrodes 138, the bumps 142a composed of photo resist beneath the organic insulating film 142 are confirmed to be free from any change even by passing through the steps of exposure, development, aluminum etching, and resist peeling.

It has been also confirmed that the shape of the bumps 142a can be controlled by the shape of the mask 151 and the thickness of the photo resist as the bumps 142a. The sharp corners of the bumps 142a may be removed easily by heat treatment after forming the bumps 142a.

The electrodes 147 formed on the other substrate 145 shown in FIG. 14 are composed of, for example, ITO, and 1000Å in thickness. Orientation films 144, 148 on the electrodes 138, 147 are formed by applying and baking the polyimide or the like. Between the substrates 131, 145, there is formed a space for injecting liquid crystal 149 by screen printing of adhesive sealant not shown, mixing a spacer of, for example, 7 μm, and by evacuating the space, the liquid crystal 149 is injected. As the liquid crystal 149, for example, guest-host liquid crystal mixing black pigment (Merck, tradename ZLI2327) is blended with 4.5% of optical active substance (Merck, tradename S811).

Figure 19:
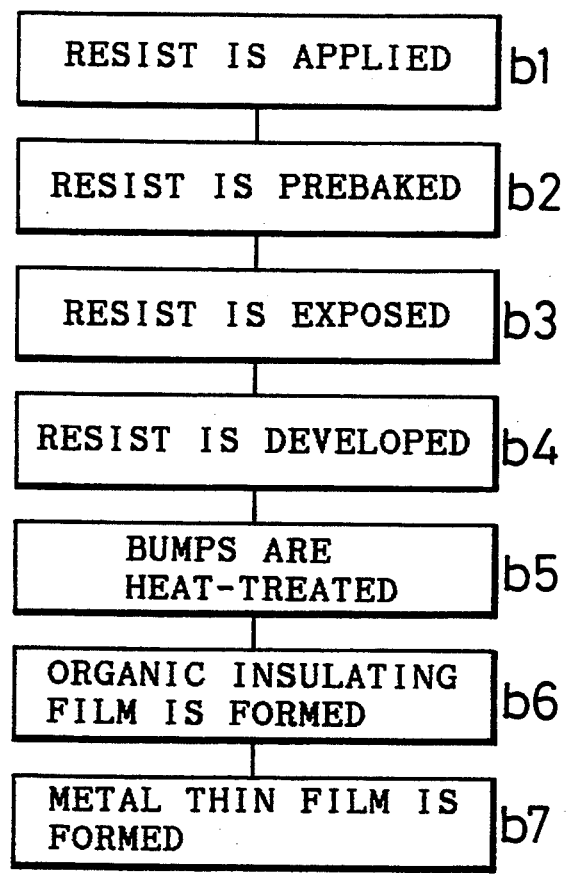
FIG. 19 is a process chart for explaining a manufacturing process of a reflector 170 used in measurement of reflective characteristic of a reflection type liquid crystal display device 130 of the invention.
Figure 20:
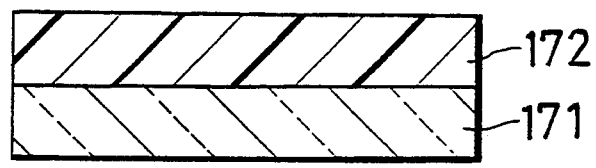
FIGS. 20(1), 20(2), 20(3), 20(4), 20(5) and 20(6) are a sectional view for explaining the process in FIG. 19.
Figure 20:
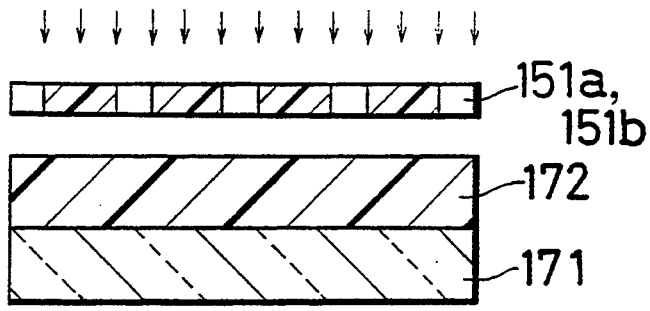
Figure 20:
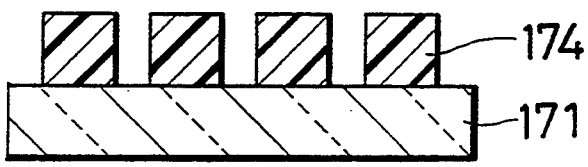
Figure 20:
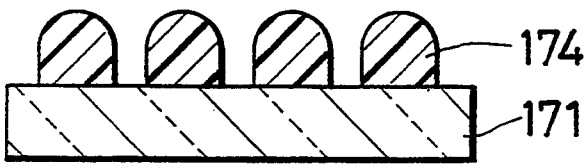
Figure 20:
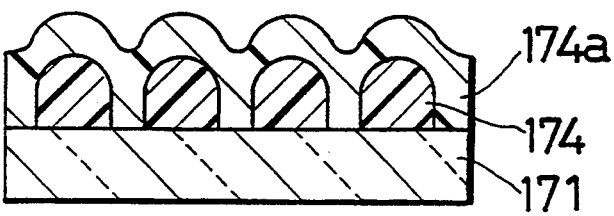
Figure 20:
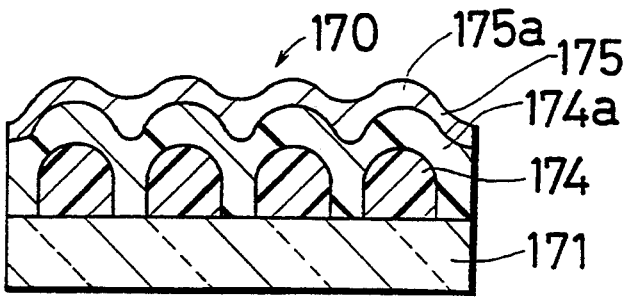

FIG. 19 is a process chart for explaining the manufacturing process of the reflector 170 used in the measurement of reflective characteristic of the reflection type liquid crystal display device 130 of the invention, and FIG. 20 is a sectional view for explaining the steps in FIG. 19. At step b1, as shown in FIG. 20(1), as resist material, for example, OFPR-800 (Tokyo Ohka Kogyo Co., LTD) is applied on one surface of 1.1 mm thick glass 171 (Corning, tradename 7059), by spin coating at 500 to 3000 rpm. In this embodiment, the resist 172 was formed into a 1.2 μm film by applying for 30 seconds at 3000 rpm. At step b2, the resist 172 is prebaked for 30 minutes at 100° C., and at step b3, as shown in FIG. 20(2), the photo mask 151 having circular light shielding regions 151a, 151b is put on the resist 172 to expose, and at step b4, as shown in FIG. 20(3), the resist 172 is developed to form irregular circular bumps 174 on the surface of the substrate 171. As the developing solution, 2.38% NMD-3 (Tokyo Ohka Kogyo Co., LTD) was used.

At step b5, by heat treatment of the bumps 174 on the glass substrate 171 at 120° to 250° C. preferably, smooth bumps 174 being rid of sharp corners are formed as shown in FIG. 20(4). In this embodiment, heat treatment was conducted for 30 minutes at 180° C. At step b6, as shown in FIG. 20(5), an organic insulating film 174a is formed on the substrate 171 forming the bumps 174. As the organic insulating film 174, polyimide resin is applied by spin coating for 20 seconds preferably at 920 to 3500 rpm. In the embodiment, applying for 20 minutes at 220 rpm, a 1 μm thick organic insulating film 174a was formed. On the organic insulating film 174a, bumps corresponding to the bumps 174 are formed, but they are smoother than the bumps 174. At step b7, as shown in FIG. 20(6), a metal thin film 175 is formed on the organic insulating film 174a. As the metal thin film 175, aluminum, nickel, chromium, silver, or copper may be used. The thickness of the metal thin film 175 is preferably about 0.01 to 1.0 μm. In this embodiment, the metal thin film 175 was formed by vacuum deposition of aluminum. Since the metal thin film 175 is formed on the organic insulating film 174a formed along the bumps 174, it possesses irregular circular bumps 175a corresponding to the bumps 174. Thus, the reflector 170 was obtained.

Figure 21:
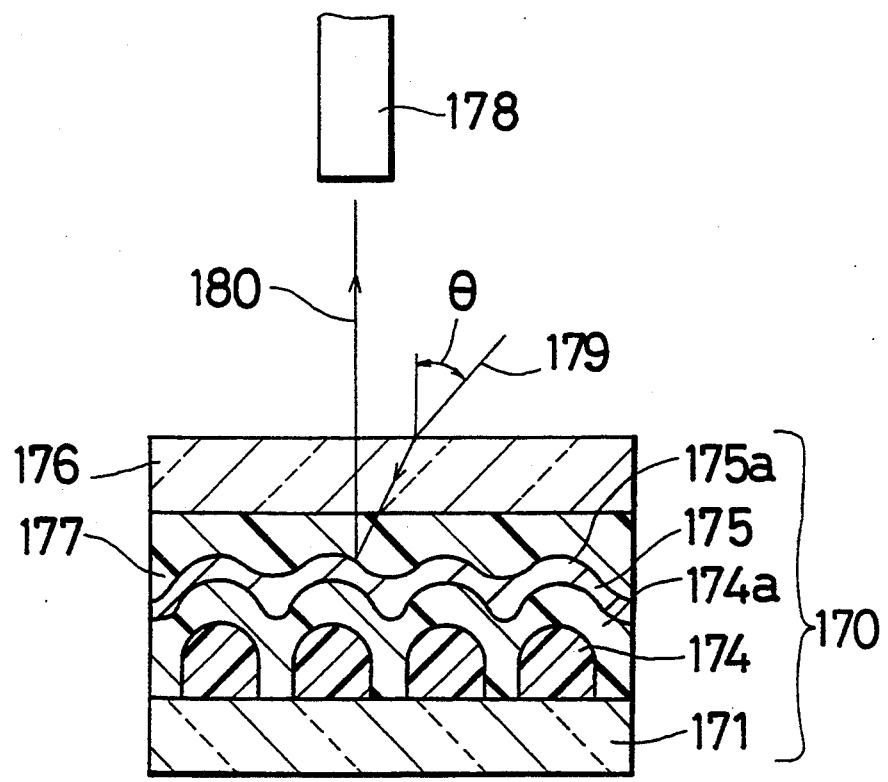
FIG. 21 is a perspective view for explaining the measuring method of reflective characteristic of a reflector 170.

FIG. 21 is a side view for explaining the method of measuring the reflective characteristic of the reflector 170. Usually, the refractive index of the substrates 131, 145 and liquid crystal 149 layer used in the liquid crystal display device is about 1.5. Assuming a constitution in which the surface of the reflector 170 contacts with the layer of liquid crystal 149, using an ultraviolet setting resin 177 with refractive index of 1.5, the glass substrate 176 was fitted tightly to the reflector 170, and the reflective characteristic of the reflector 170 was measured. As a result of the measurement it has been confirmed that the same results as the reflective characteristic in the boundary of the surface of the reflector 175 and liquid crystal 149 layer is obtained.

As shown in FIG. 21, the reflective characteristic is measured by detecting the scattered light 180 of the incident light 179 entering the reflector 170 by means of a photo multimeter 178. The incident light 170 enters the reflector 170 at an angle $\theta$ to its normal line. The photo multimeter 178 is fixed in the normal direction of the reflector 170 passing the point where the incident light 179 on the metal thin film 175 is emitted. By varying the incident angle $\theta$ of the incident light 179 and measuring the intensity of the scattered light 180 by the metal thin film 175 of the incident light 179, the reflective characteristic is obtained.

Figure 22:
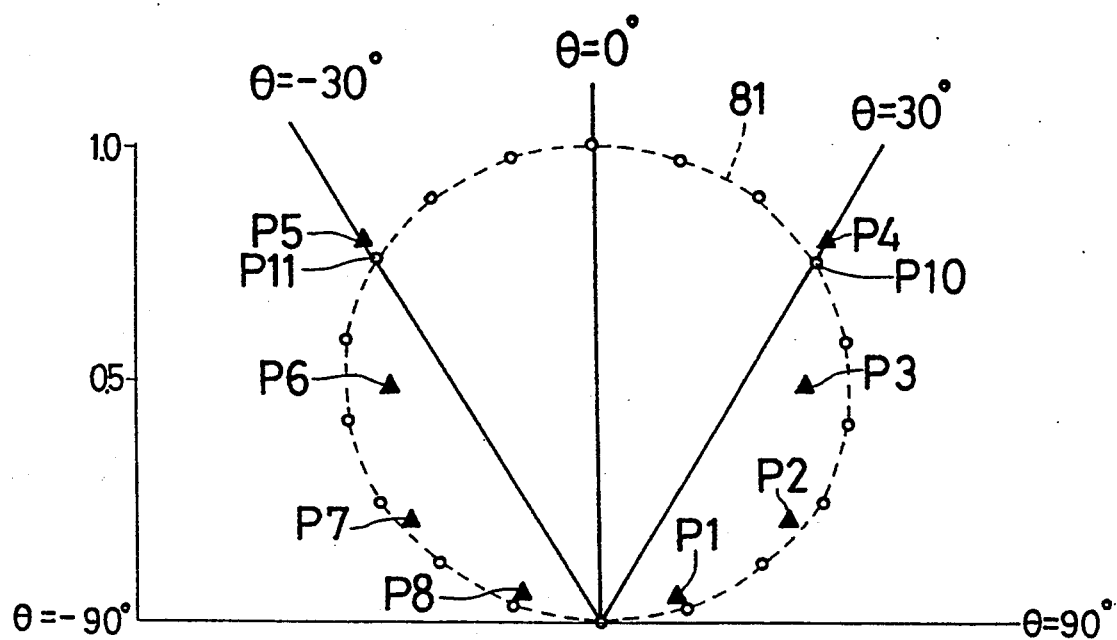
FIG. 22 is a graph showing the relation between incident angle $\theta$ and reflection intensity.

FIG. 22 is a graph showing the relation between the incident angle $\theta$ and reflective intensity. The reflective intensity of the incident light 179 as the incident angle $\theta$ is expressed as the distance from the origin in the direction of angle $\theta$ to the line of $\theta=0°$. The reflective intensity at $\theta=70°$ is indicated by P1, the reflective intensity at $\theta=60°$ by P2, the reflective intensity at $\theta=40°$ by P3, the reflective intensity at $\theta=30°$ by P4, the reflective intensity at $\theta=-30°$ by P5, the reflective intensity at $\theta=-40°$ by P6, the reflective intensity at $\theta=-60°$ by P7, and the reflective intensity at $\theta=-70°$ by P8.

In FIG. 22, the reflective characteristic curve of the standard white panel of magnesium oxide is indicated by broken line 81. The reflective intensity P4 at $\theta=30°$ is superior to the reflective intensity P10 of magnesium oxide at $\theta=30°$, and the reflective intensity at $\theta=-30°$ is also known to be superior to the reflective intensity P11 of magnesium oxide at $\theta=-30°$.

Thus, according to this embodiment, it is easy to control the shape, and the reflection electrodes 138 are formed along bumps 142b on the organic insulating film 142 having the bumps 142b formed along the bumps 142a on the bumps 142a made of the photo resist possessing reproducibility. By controlling the shape of the bumps 142a, reflection electrodes 138 having excellent reflective characteristic are obtained, and the display quality of the reflection type liquid crystal display device is enhanced.

Figure 23A:
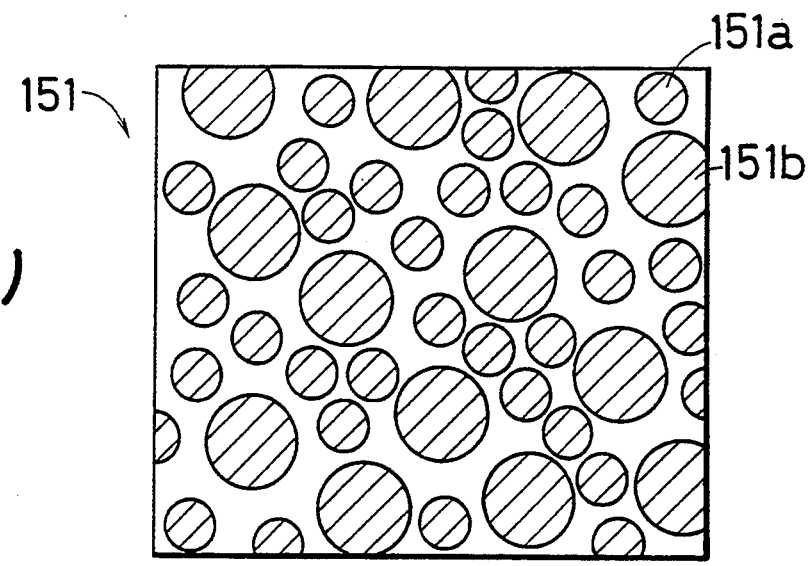
FIGS. 23(a) and 23(b) are a drawing showing a preferable mask 151.
Figure 23B:
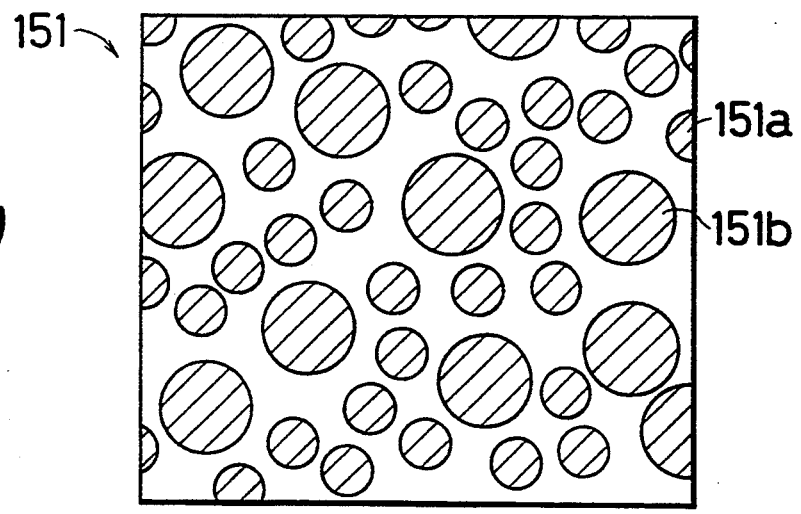

As the mask 151, it is desired to use the one as shown in FIG. 23. In FIG. 23 (a), the mask light shielding regions 151a, 151b are about 47%, and in FIG. 23 (b), the light shielding regions 151a, 151b are 41%.

Figure 24:
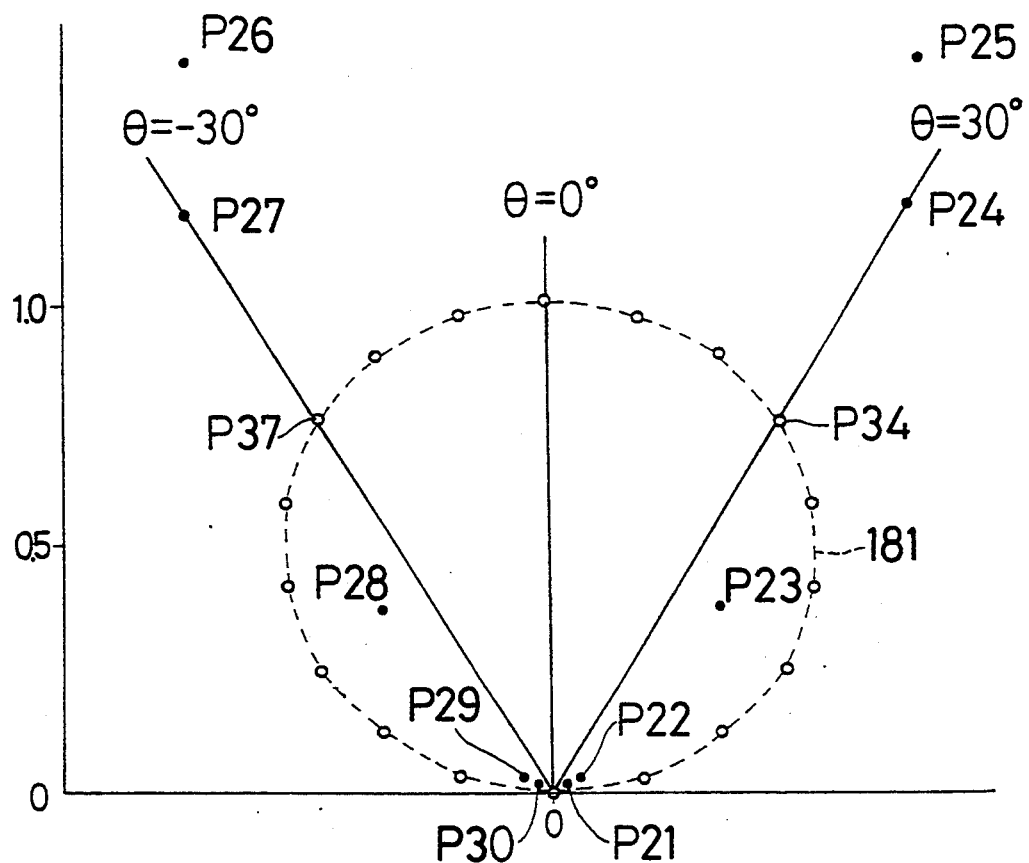
FIG. 24 is a graph showing the relation between the incident angle $\theta$ and reflective intensity in a reflective thin film 75 composed of masks 151 of which light shielding regions 151a, 151b are 40% or more.

FIG. 24 is a graph showing the relation between the incident angle $\theta$ and reflective intensity in a reflective thin film 75 formed by using the masks 151, 152 of which light shielding regions 151a, 151b are 40% or more. The reflective intensity of the incident light 78 at incident angle $\theta$ is expressed as the distance from the origin O in the direction of angle $\theta$ to the line of $\theta=0°$. The reflective intensity at $\theta=70°$ is indicated by P21, the reflective, intensity at $\theta=60°$ by P22, the reflective intensity at $\theta=40°$ by P23, the reflective intensity at $\theta=30°$ by P24, the reflective intensity at $\theta=25°$ by P25, the reflective intensity at $\theta=-25°$ by P26, the reflective intensity by $\theta=-30°$ by P27, the reflective intensity at $\theta=-40°$ by P28, the reflective intensity at $\theta=-60°$ by P29, and the reflective intensity at $\theta=-70°$ by P30.

FIG. 24 shows the reflective characteristic curve of the standard white board of magnesium oxide by broken line 181. The reflective intensity P24 at $\theta=30°$ is superior to the reflective intensity P34 of magnesium oxide at $\theta=30°$, and the reflective intensity P27 at $\theta=-30°$ is also known to be superior to the reflective intensity P37 of magnesium oxide at $\theta=-30°$.

Figure 25:
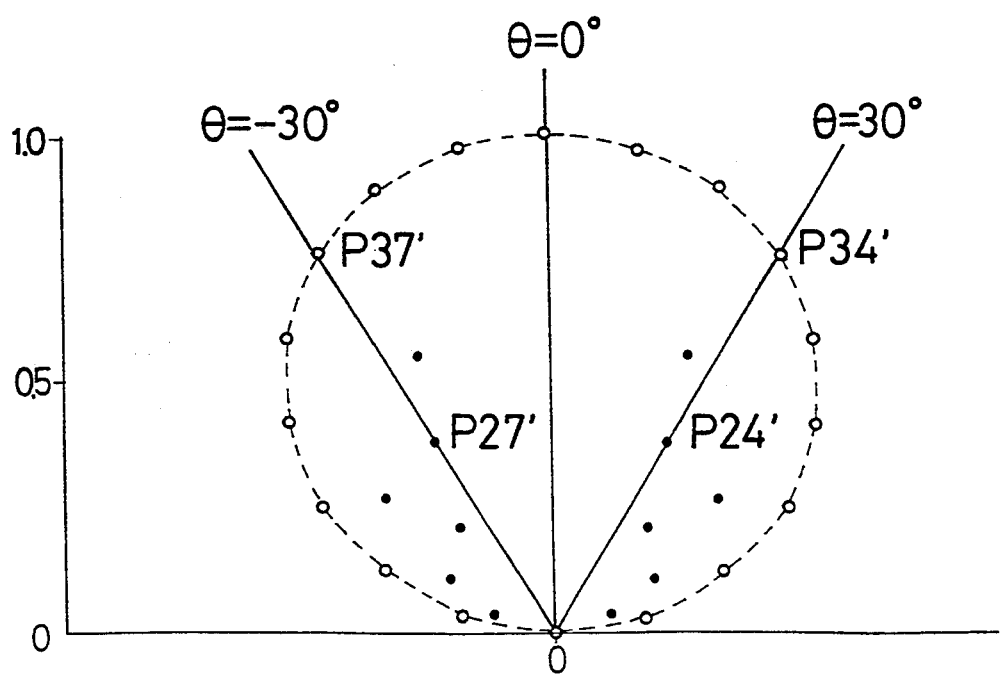
FIG. 25 is a graph showing the relation between the incident angle θ and reflective intensity in a reflective thin film 75 composed of masks 51, 151 of which light shielding regions 151a, 151b are 35%.

By contrast, by using a mask 151 of which light shielding regions 151a, 151b are less than 40%, for example, 35%, a reflector was obtained in a similar method, and its reflective characteristic is shown in FIG. 25. The reflective intensity P24' at $\theta=30°$ is inferior to the reflective intensity P34' of magnesium oxide at $\theta=-30°$, and the reflective intensity P27' at $\theta=-30°$ is also known to be inferior to the reflective intensity P37' of magnesium oxide at $\theta=-30°$. This is considered because the normal reflection components are too many if the bumps are less than 40%, while the scatter is less, thereby narrowing the viewing field.

Figure 26:
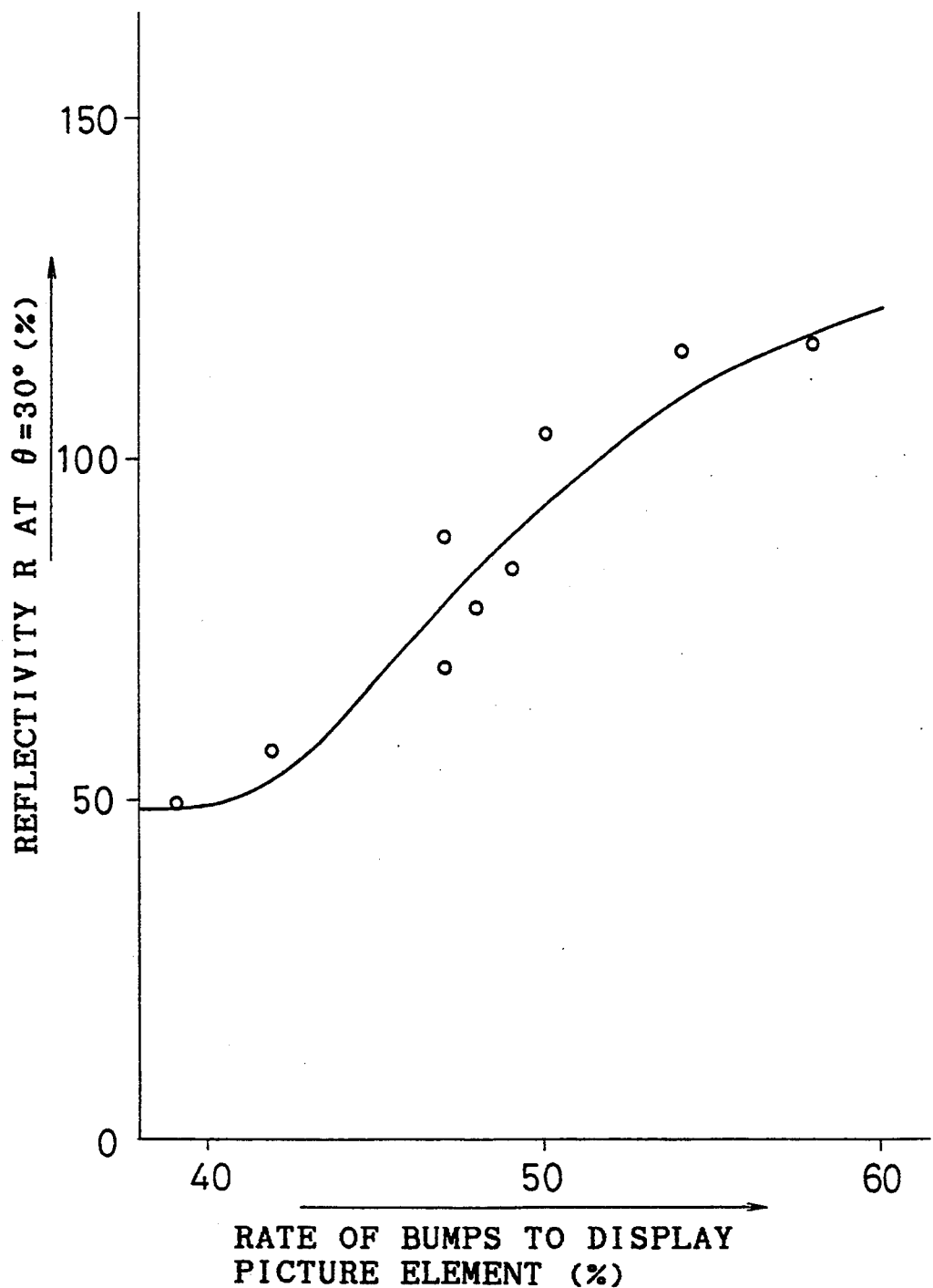
FIG. 26 is a graph showing the relation between the rate of light shielding regions 151a, 151b and the reflectivity.

FIG. 26 shows the reflectivity at $\theta=30°$ of the reflector fabricated by using the mask 151 by varying the rate of light shielding regions 151a, 151b. It is known from FIG. 26 that the reflector of high reflectivity may be obtained by setting the rate of the bumps at 40% or more. Besides, by selecting the type or film thickness of photo resist, or heat treatment temperature, the slant angle of the bumps may be freely controlled, so that the reflective characteristic may be controlled. In addition, the reflective characteristic may be also controlled by the type or film thickness of the organic insulation film.

In the reflection type liquid crystal device 130 of the embodiment, since the surface on which the reflection electrodes 138 are formed is positioned at the liquid crystal 149 side, parallax is eliminated, and favorable display screen is obtained. In the embodiment, moreover, since the reflection electrodes 138 having asperities are disposed at the liquid crystal 149 layer side or at positions nearly adjacent to the liquid crystal 149 layer, the height H1 of the bumps 142b should be smaller than the cell thickness, and the slant angle of the bumps should be moderate so as not to disturb the array of liquid crystal.

In this embodiment, the bumps 142a are formed only in the region of forming the reflection electrodes 138, but the bumps 142a may be formed on the entire surface of the substrate 131. Or using transparent electrodes for reflection electrodes 138, reflectors may be separately installed. In this case, similarly, the reflectors are formed on the organic insulating film formed on irregular plural bumps. As the switching element, the TFT 140 is used in the reflection type liquid crystal display device 130 of active matrix drive system in this embodiment, but this is not limitative, and same effects are obtained in the reflection type liquid crystal display device of simple matrix drive system.

Furthermore, in the foregoing embodiment, the organic insulating film 142 was patterned by dry etching method, but wet etching method using alkaline solution may be also done when the polyimide resin is used for the organic insulating film 142. Instead of the polyimide resin for the organic insulating film 142, acrylic resin or other organic material may be also used. As the substrate 131, in this embodiment, a transparent material such as glass is used, but similar effects are expected by using opaque material such as silicon substrate, and in this case it is advantageous because the circuit can be integrated on the substrate.

In the foregoing embodiments, as the display mode, the phase transition type guest-host mode is illustrated, but this is not limitative, and same effects are obtained by other modes, including other light absorption modes such as two-layer type guest-host mode, light scattering type display mode such as high molecular dispersion type liquid crystal display device, and double refractive display mode used in ferrodielectric liquid crystal display device. In this embodiment, the TFT 140 is used as the switching element, but the invention may be also applied to the active matrix substrate using, for example, MIM (metal-insulator-metal) element, diode, varistor, or the like.

Figure 27:
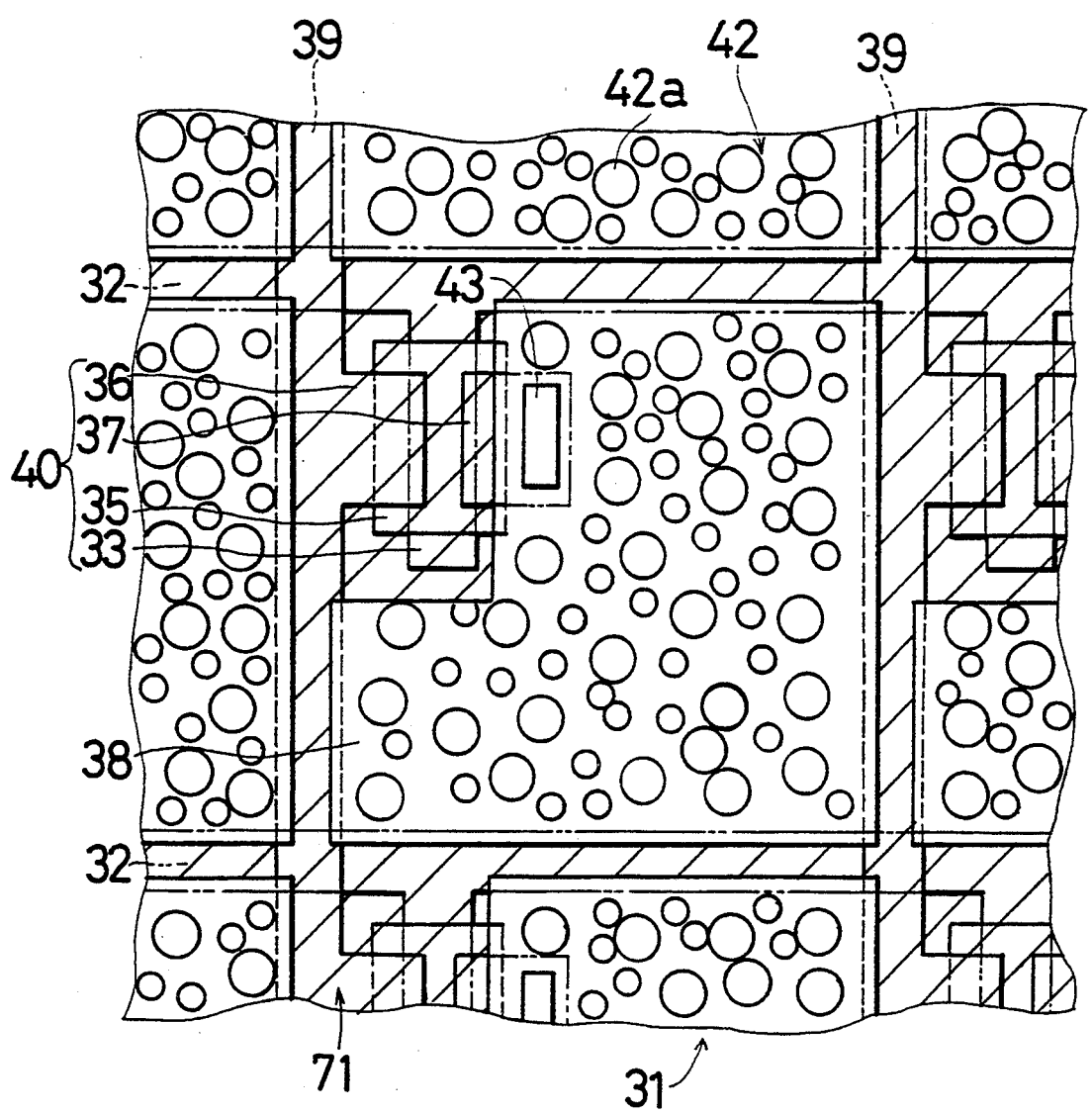
FIG. 27 is a plan view for explaining a further different embodiment of the invention.

FIG. 27 is a plan view for explaining a further difference embodiment of the invention. It is a feature of the embodiment that a black light shielding layer 71 made of electric insulating material is formed on the reflective matrix substrate 31 on which asperities are formed as shown in FIG. 6. The black light shielding layer 71 is formed in the hatched area in FIG. 27, that is, the region other than the reflection electrode 38 and the forming region of the semiconductor layer 35 for composing the TFT 40. Meanwhile, it is also possible to form the black light shielding layer 71 on the reflective active matrix substrate 131 shown in FIG. 14 and FIG. 15.

Figure 28:
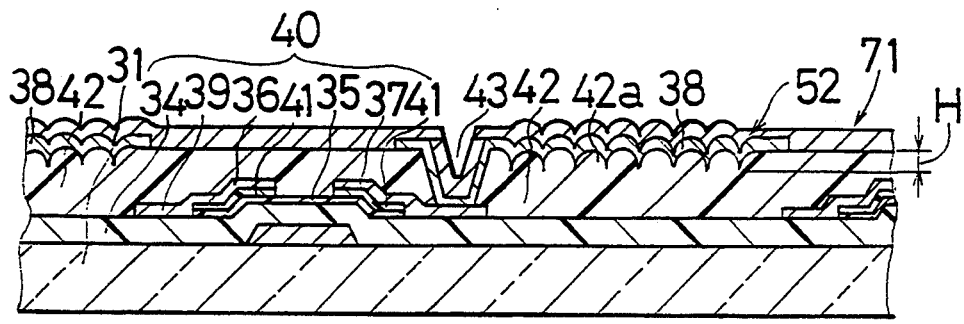
FIGS. 28(1), 28(2) and 28(3) are a sectional view for explaining the forming method of a black light shielding layer 71.
Figure 28:
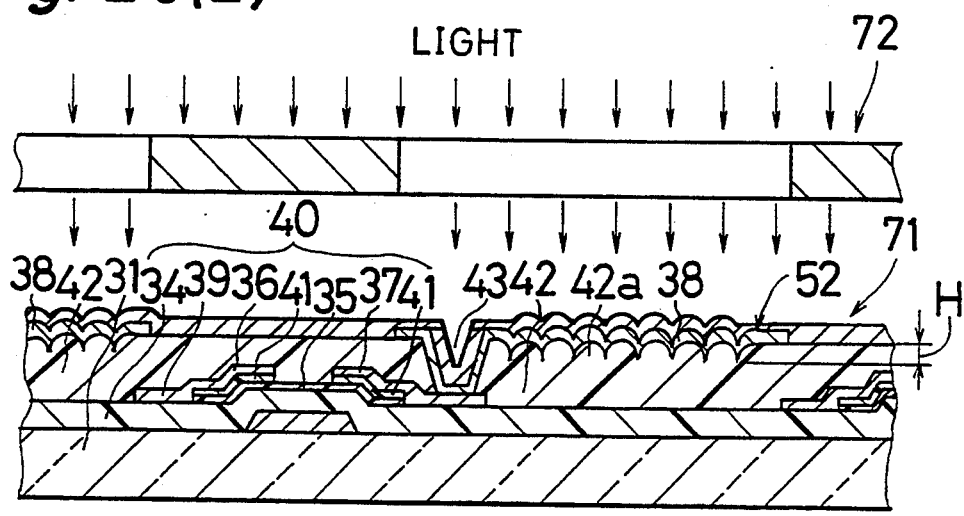
Figure 28:
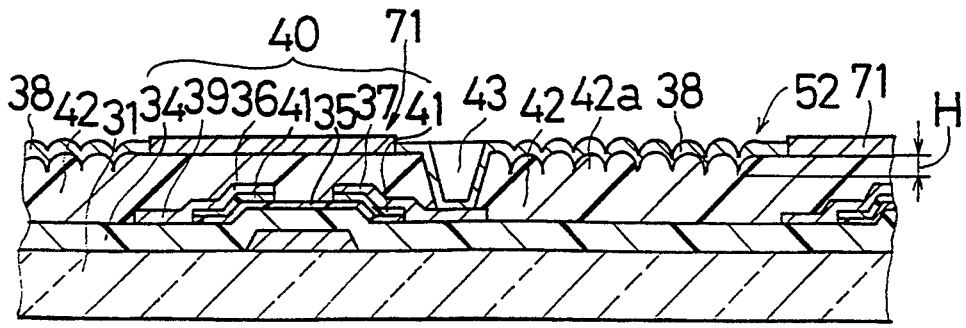

FIG. 28 is a sectional view for explaining the forming method of the black light shielding layer 71. This is to explain an example of the active matrix substrate 31 shown in FIG. 6, but it holds true with the active matrix substrate 131, too.

First, as shown in FIG. 28 (1), the whole surface of the substrate 31 is coated with a photosensitive acrylic resin dispersing pigments of red, blue and green in order to absorb visible lights, for example, a black resin 71 mixing three types of Fuji Hunt products in the trade names of Color Mosaic CR, CG, CB, by means of a spinner.

In succession, as shown in FIG. 28 (2), exposing by using a specified mask 72, and developing, the unnecessary portions are removed by etching so as to cover completely the regions other than the reflection electrode 38 and the forming region of the semiconductor layer 35 for composing the TFH 41, and a black light shielding layer 71 is formed as shown in FIG. 28 (3). Then by heating at 200° C. for an hour, the black light shielding layer 71 is hardened.

Thus, according to the embodiment, by forming the black light shielding layer 71, it is designed to cut off the reflected light (scattered light) in other parts than the reflection electrode 38, so that leak of light unnecessary for display may be prevented, thereby realizing a reflection type liquid crystal display device excellent in contrast. Still more, as compared with the case of forming the black light shielding layer 71 on the confronting substrate 45, the substrate pasting marging may be wider, and lowering of aperture rate due to deviation in pasting may be decreased, so that a bright display may be realized.

In this embodiment, as the material for the black light shielding layer 71, an acrylic resin dispersion pigments is used, but other maybe used, such as acrylic resin dispersing carbon, for example, organic material such as trade name Color Mosaic of Fuji Hunt, amorphous silicon germanium (a-SiGe:H), and inorganic material such as electroless plating of silver. The thickness of the black light shielding layer 71 may be set according to the absorption coefficient of the material to be used, preferably so that the transmissivity may be at least 5% or less, or more preferably 1% or less.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflection type liquid crystal display device comprising, on the liquid crystal layer side surface on one of the substrates of a pair of transparent substrates disposed opposedly across a liquid crystal layer, plural reflection electrodes as display picture elements for reflecting the incident light from the other substrate side, a plurality of thin film transistors that function as switching elements, each transistor having a source electrode with source bus lines connecting source electrodes, the source bus lines having areas overlapping a part of a refection electrode, and distribution electrodes, parts of which are overlapped by the reflection electrodes, for applying voltage for display to the reflection electrodes and forming common electrodes possessing light transmissivity nearly over the entire surface on the liquid crystal display side surface on the other substrate, wherein the reflection electrodes are formed on an electric insulating film extending over the entire surface of the substrate except for the connection parts of the one reflection electrodes with the distribution electrodes, the reflection electrodes possessing plural bumps only in the reflection electrode forming regions not overlapping the distribution electrodes and not in the areas where the reflection electrodes and source bus lines overlap.

2. A reflection type liquid crystal display device of claim 1, wherein the bumps are arranged irregularly.

3. A reflection type liquid crystal display device of claim 1, wherein the bumps are formed in a taper having a spherical end portion.

4. A reflection type liquid crystal display device of claim 1, wherein the bumps are one type that are identical in size or comprise two or more different types that differ in size.

5. A reflection type liquid crystal display device of claim 1, wherein the height of the bumps is not more than 10 $\mu$m.

6. A reflection type liquid crystal display device of claim 1, wherein the arrangement pattern of bumps is identical in each reflection electrode.

7. A reflection type liquid crystal display device in accord with claim 6, wherein the bumps are formed in a random pattern in each reflection electrode.

8. A reflection type liquid crystal display device of claim 1, wherein a light shielding film possessing an electric insulating property is formed in the region of connecting part with the reflection electrode on the distribution electrode formed on one substrate and in the region not overlapping with the reflection electrode on the distribution electrode.

9. The reflection type liquid crystal display device of claim 1, wherein the a plurality of bumps are formed in the electric insulating film except plural bumps are not formed on the area where the reflection electrodes and distribution electrodes are overlapped.

10. The reflection type liquid crystal display device of claim 1, further comprising a color filter disposed on the substrate opposing the reflection electrodes.

11. A reflection type liquid crystal display device possessing a reflector for reflecting the incidental light from the other substrate side, on one of the substrates of a pair of substrates disposed opposedly across a liquid crystal layer, wherein the reflector is on an electric insulating film having plural bumps arranged irregularly at the liquid crystal layer side on one substrate, except the bumps are not in the areas where the reflector and source bus lines overlap.

12. A reflection type liquid crystal display device of claim 11, wherein the bumps are one type that are identical in size or comprise two or more different types that differ in size.

13. A reflection type liquid crystal display device of claim 11, wherein the plural bumps are formed in a taper having a spherical end portion.

14. A reflection type liquid crystal display device of claim 11, wherein the height of the bumps is not more than 10 $\mu$m.

15. A reflection type liquid crystal display device of claim 11, wherein the plural bumps of the reflector arranged irregularly at the liquid crystal layer side of one substrate are 20 $\mu$m or less in diameter, and occupy 40% or more of the total area of the reflector.

16. A reflection type liquid crystal display device of claim 11, wherein the reflector is an electrode to be used as a display picture element.

17. A manufacturing method of reflection type liquid crystal display device possessing a reflector for reflecting the incident light from the other substrate side, on one substrate of a pair of substrates disposed opposedly across a liquid crystal layer, the method comprising applying a photosensitive resin to the liquid crystal layer side surface of one substrate, exposing through the photosensitive resin light shielding means having circular light shielding regions arranged irregularly, developing the photosensitive resin, forming plural bumps by heating the photosensitive resin, forming an insulating film covering the plural bumps on the obtained plural bumps, and forming the reflector made of thin metal film on the insulating film.

18. A manufacturing method of reflection type liquid crystal display device of claim 17, wherein the total area of the circular light shielding regions of the light shielding means occupy 40% or more of the total area of the light shielding means, and 20 $\mu$m or less in the diameter of the circles arranged irregularly.

* * * * *

UNITED STATES PATENT AND TRADEMARK OFFICE
CERTIFICATE OF CORRECTION

PATENT NO. : 5,408,345
DATED : April 18, 1995
INVENTOR(S) : Mitsui, et al.

It is certified that error appears in the above-identified patent and that said Letters Patent is hereby corrected as shown below:

On title page, item
[75] The fourth named inventor should be changed from "Hisakawa Nakamura";

to --Hisakazu Nakamura--.

Signed and Sealed this

Eighth Day of August, 1995

Attest:

BRUCE LEHMAN

*Attesting Officer*     *Commissioner of Patents and Trademarks*